United States Patent
Shu et al.

(10) Patent No.: US 12,361,601 B2
(45) Date of Patent: Jul. 15, 2025

(54) IDENTITY PRESERVED CONTROLLABLE FACIAL IMAGE MANIPULATION

(71) Applicant: Adobe Inc., San Jose, CA (US)

(72) Inventors: Zhixin Shu, San Jose, CA (US); Zhe Lin, Clyde Hill, WA (US); Yuchen Liu, Princeton, NJ (US); Yijun Li, Seattle, WA (US); Richard Zhang, San Franciso, CA (US)

(73) Assignee: Adobe Inc., San Jose, CA (US)

( * ) Notice: Subject to any disclaimer, the term of this patent is extended or adjusted under 35 U.S.C. 154(b) by 527 days.

(21) Appl. No.: 17/709,895

(22) Filed: Mar. 31, 2022

(65) Prior Publication Data

US 2023/0316591 A1    Oct. 5, 2023

(51) Int. Cl.
*G06T 11/00*    (2006.01)
*G06V 10/40*    (2022.01)
*G06V 10/774*    (2022.01)

(52) U.S. Cl.
CPC .............. *G06T 11/00* (2013.01); *G06V 10/40* (2022.01); *G06V 10/7747* (2022.01)

(58) Field of Classification Search
None
See application file for complete search history.

(56) References Cited

U.S. PATENT DOCUMENTS

2021/0089884 A1* 3/2021 Macready .............. G06N 3/045

OTHER PUBLICATIONS

Tewari A, Elgharib M, Bharaj G, Bernard F, Seidel HP, Pérez P, Zollhofer M, Theobalt C. Stylerig: Rigging stylegan for 3d control over portrait images. In Proceedings of the IEEE/CVF conference on computer vision and pattern recognition 2020 (pp. 6142-6151). (Year: 2020).*

Doukas MC, Koujan MR, Sharmanska V, Roussos A, Zafeiriou S. Head2head++: Deep facial attributes re-targeting. IEEE Transactions on Biometrics, Behavior, and Identity Science. Jan. 11, 2021;3(1):31-43. (Year: 2021).*

Blanz, Volker, et al., "A Morphable Model for the Synthesis of 3D Faces", Proceedings of the 26th annual conference on Computer graphics and interactive techniques [retrieved Feb. 17, 2022]. Retrieved from the Internet <https://redwood.berkeley.edu/wp-content/uploads/2018/08/Blanz-siggraph-99.pdf>., Jul. 1, 1999, 8 Pages.

(Continued)

*Primary Examiner* — Vincent Rudolph
*Assistant Examiner* — Meredith Taylor
(74) *Attorney, Agent, or Firm* — FIG.1 Patents

(57) ABSTRACT

Techniques for identity preserved controllable facial image manipulation are described that support generation of a manipulated digital image based on a facial image and a render image. For instance, a facial image depicting a facial representation of an individual is received as input. A feature space including an identity parameter and at least one other visual parameter is extracted from the facial image. An editing module edits one or more of the visual parameters and preserves the identity parameter. A renderer generates a render image depicting a morphable model reconstruction of the facial image based on the edit. The render image and facial image are encoded, and a generator of a neural network is implemented to generate a manipulated digital image based on the encoded facial image and the encoded render image.

20 Claims, 20 Drawing Sheets

(56) References Cited

OTHER PUBLICATIONS

Blanz, V., et al., "Reanimating Faces in Images and Video", Computer Graphics Forum [retrieved Feb. 17, 2022]. Retrieved from the Internet <http://citeseerx.ist.psu.edu/viewdoc/download?doi=10.1.1.479.3387&rep=rep1&type=pdf>., 2003, 11 Pages.

Deng, Yu, et al., "Accurate 3D Face Reconstruction With Weakly-Supervised Learning: From Single Image to Image Set", Cornell University arXiv, arXiv.org [retrieved Feb. 17, 2022]. Retrieved from the Internet <https://arxiv.org/pdf/1903.08527.pdf>., Apr. 9, 2020, 11 Pages.

Deng, Jiankang, et al., "ArcFace: Additive Angular Margin Loss for Deep Face Recognition", Cornell University arXiv, arXiv.org [retrieved Feb. 17, 2022]. Retrieved from the Internet <https://arxiv.org/pdf/1801.07698.pdf>., Feb. 2019, 11 pages.

Deng, Yu, et al., "Disentangled and Controllable Face Image Generation via 3D Imitative-Contrastive Learning", Cornell University arXiv, arXiv.org [retrieved Feb. 17, 2022]. Retrieved from the Internet <https://arxiv.org/pdf/2004.11660.pdf>., Sep. 4, 2020, 17 Pages.

Goodfellow, Ian J, et al., "Generative Adversarial Nets", In: Advances in neural information processing systems (2014) [retrieved Feb. 17, 2022]. Retrieved from the Internet <https://www.cs.utah.edu/~zhe/teach/archived/2019f/6190-pdf/gans.pdf>., Jun. 10, 2014, 9 pages.

He, Kaiming, et al., "Deep Residual Learning for Image Recognition", Proceedings of the IEEE conference on computer vision and pattern recognition, 2016 [retrieved Feb. 18, 2022], Retrieved from the Internet: <https://openaccess.thecvf.com/content_cvpr_2016/papers/He_Deep_Residual_Learning_CVPR_2016_paper.pdf>., Jun. 2016, 12 pages.

Heusel, Martin, et al., "GANs Trained by a Two Time-Scale Update Rule Converge to a Local Nash Equilibrium", NIPS'17: Proceedings of the 31st International Conference on Neural Information Processing Systems [retrieved Feb. 17, 2022]. Retrieved from the Internet <https://proceedings.neurips.cc/paper/2017/file/8a1d694707eb0fefe65871369074926d-Paper.pdf>., Jan. 12, 2018, 12 pages.

Karras, Tero, et al., "A Style-Based Generator Architecture for Generative Adversarial Networks", Cornell University arXiv, arXiv.org [retrieved Feb. 17, 2022]. Retrieved from the Internet <https://arxiv.org/pdf/1812.04948.pdf>., Mar. 29, 2019, 12 pages.

Karras, Tero, et al., "Analyzing and Improving the Image Quality of StyleGAN", Cornell University arXiv, arXiv.org [retrieved Feb. 17, 2022]. retrieved from the Internet <https://arxiv.org/pdf/1912.04958.pdf>., Dec. 2019, 21 Pages.

Paysan, Pascal, et al., "A 3D Face Model for Pose and Illumination Invariant Face Recognition", IEEE International Conference on Advanced Video and Signal Based Surveillance [retrieved Feb. 17, 2022]. Retrieved from the Internet <http://citeseerx.ist.psu.edu/viewdoc/download?doi=10.1.1.715.1710&rep=rep1&type=pdf>., Sep. 2, 2009, 6 Pages.

Richardson, Elad, et al., "Encoding in Style: A StyleGAN Encoder for Image-to-Image Translation", Cornell University arXiv, arXiv.org [retrieved Feb. 17, 2022]. Retrieved from the Internet <https://arxiv.org/pdf/2008.00951.pdf>., Aug. 2020, 21 Pages.

Zhang, Richard, et al., "The Unreasonable Effectiveness of Deep Features as a Perceptual Metric", Cornell University arXiv, arXiv.org [retrieved Feb. 17, 2022]. Retrieved from the Internet <https://arxiv.org/pdf/1801.03924.pdf>., Apr. 10, 2018, 14 Pages.

* cited by examiner

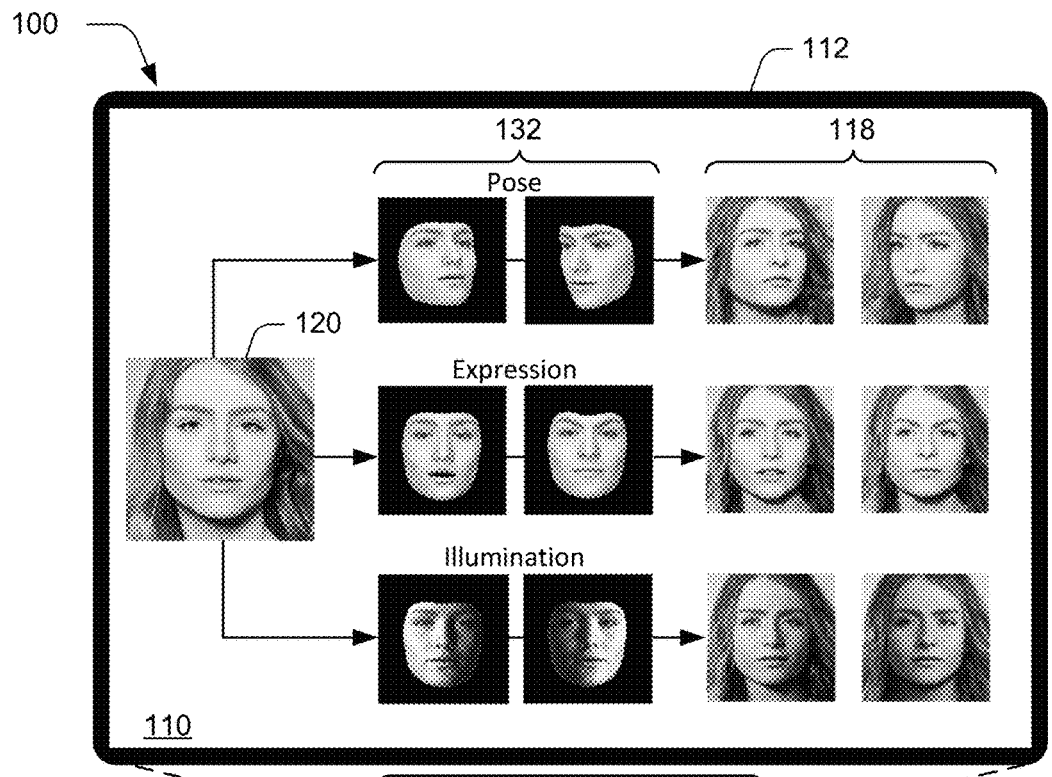
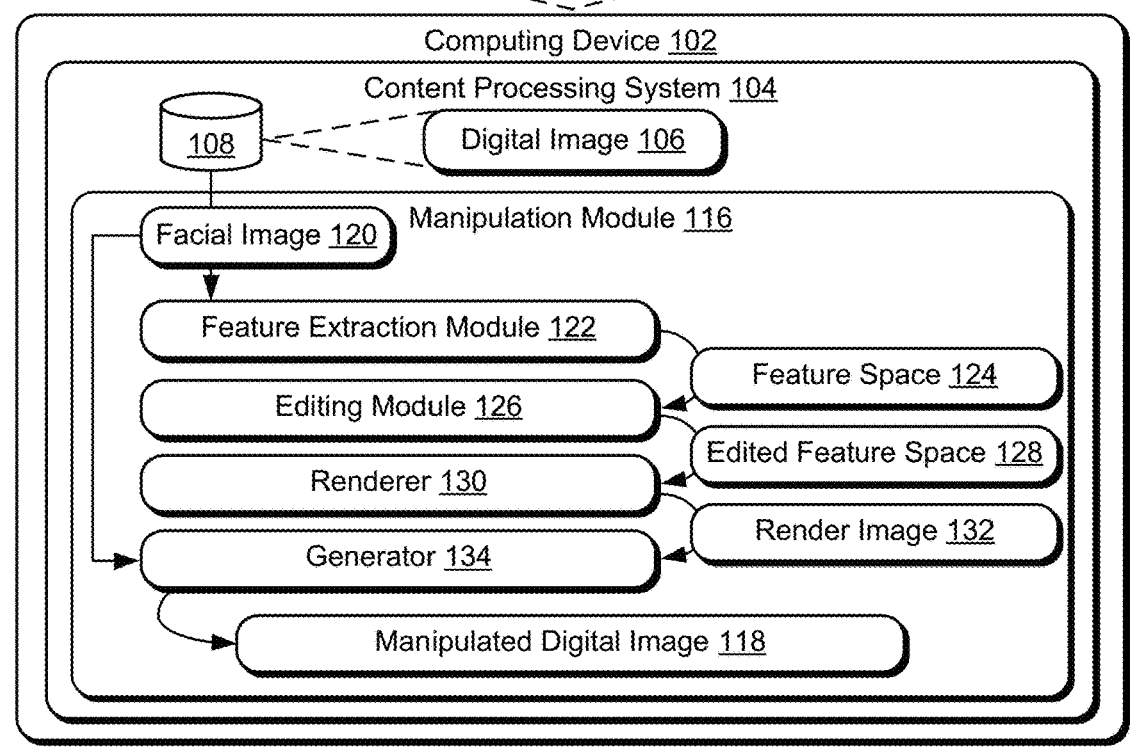
Fig. 1

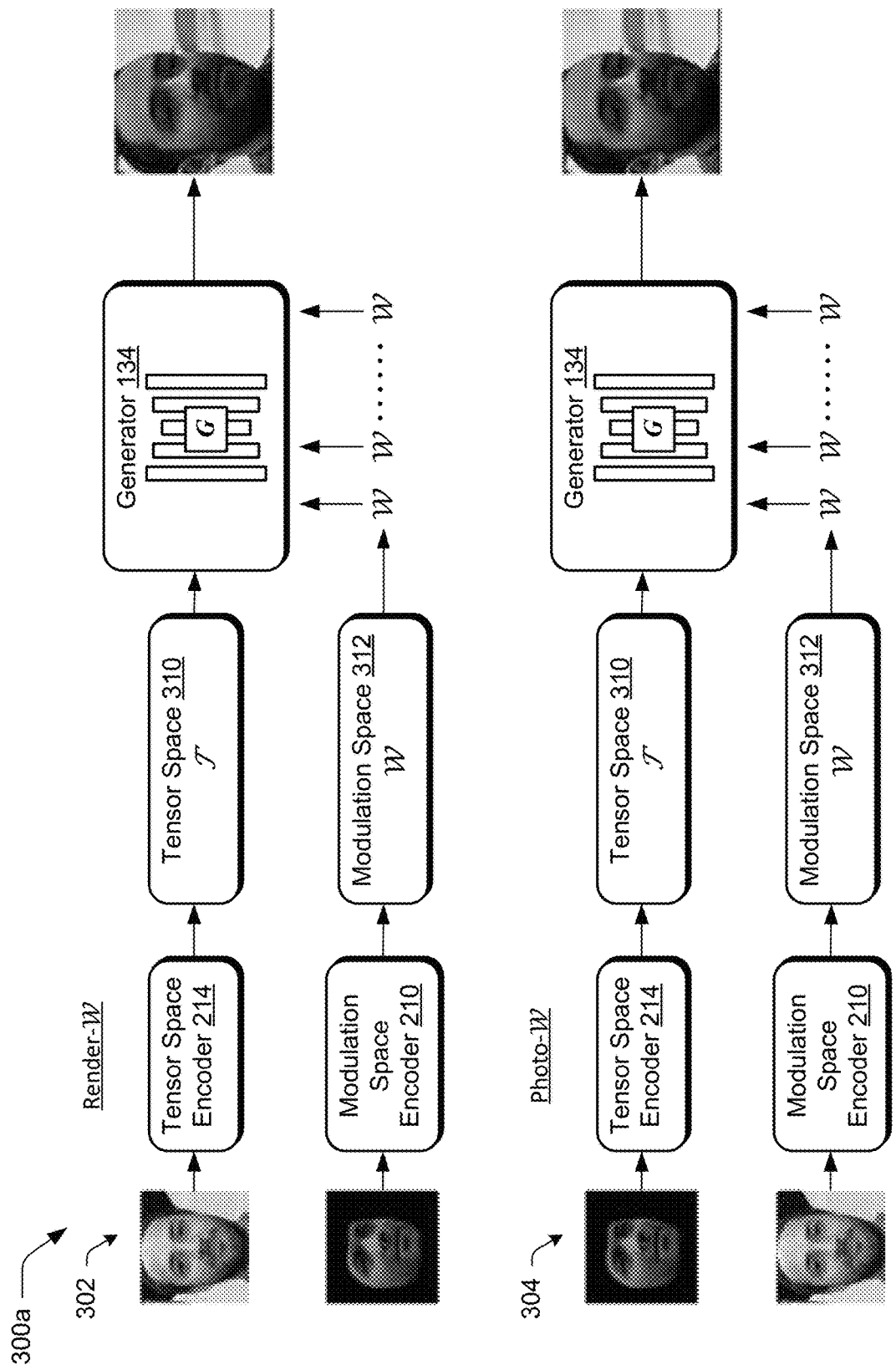

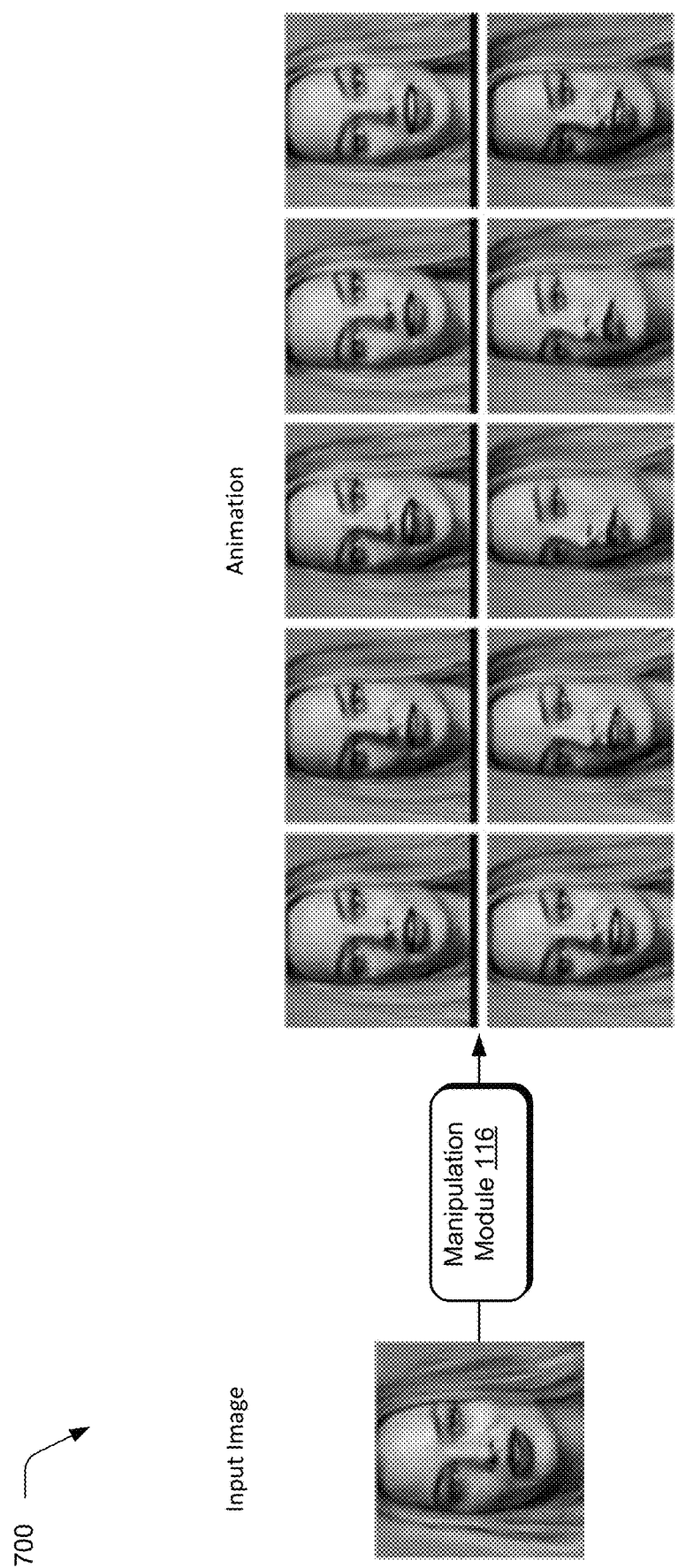

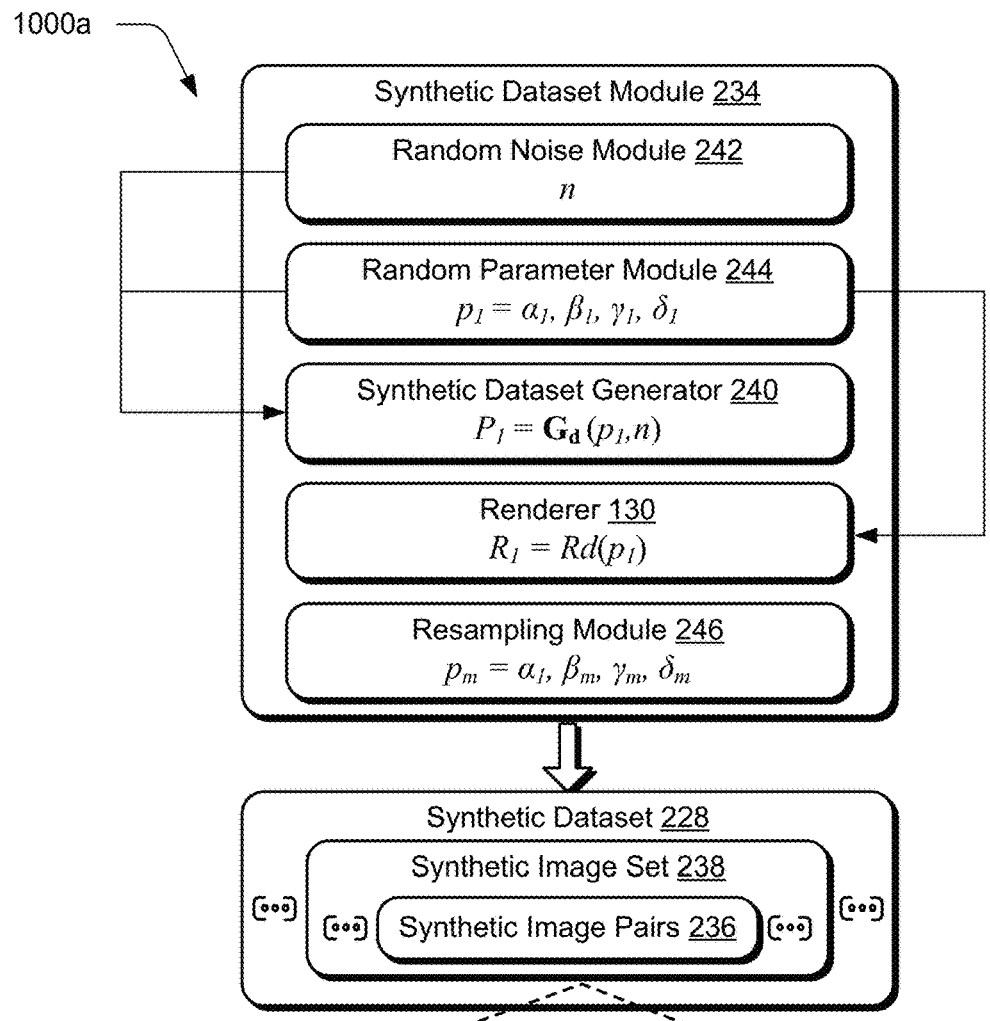
Fig. 10a

IDENTITY PRESERVED CONTROLLABLE FACIAL IMAGE MANIPULATION

BACKGROUND

Facial image synthesis often involves generating renditions of human likenesses and has a wide range of applications such as photo editing, face recognition applications, content creation, and AR/VR applications. In recent years, facial image synthesis has made significant advances, particularly with the development and incorporation of generative adversarial networks (GAN's). However, conventional GAN-based techniques are primarily implemented to synthesize random faces, and thus lack meaningful control over visual features of output images. Additionally, these conventional techniques frequently experience identity loss in generated images as well as an increased propensity for visual artifacts.

Further, three-dimensional morphable models (3DMM's) have long been used for face-modelling. However, conventional 3DMM's require extensive three-dimensional or four-dimensional scans of human heads to build, which can be time-consuming, costly, and computationally expensive. Additionally, 3DMM's rely on a low-dimensional linear representation and lack fine-details. Thus, conventional photo-rendering methods based on 3DMM's alone result in non-photorealistic output images. Accordingly, conventional methods face inadequate photorealism, encounter limited control over editability, and regularly experience identity loss and visual artifacts.

SUMMARY

Techniques for identity preserved controllable facial image manipulation are described that support editing of multiple discrete features of facial images while maintaining photorealism and preventing identity loss. In an example, a computing device implements a manipulation module to receive as input a facial image depicting a facial representation of an individual. A feature space including an identity parameter and at least one other visual parameter is extracted from the facial image. The feature space is edited such that the identity parameter is preserved, while one or more of the other visual parameters are modified. From the edited feature space, a renderer generates a render image depicting a morphable model reconstruction of the facial image with the edit applied. A generator of a neural network is trained and implemented to generate a manipulated digital image based on the facial image and the render image. By extracting and preserving identity information from an input image, identity-loss is minimized in generation of the manipulated digital image. Further, by using render images as three-dimensional controls, the techniques described herein embed comprehensive edits at the pixel level which results in increased editability without a loss in photorealism.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 1 is an illustration of an environment in an example implementation that is operable to employ the identity preserved controllable facial image manipulation techniques described herein.

FIGS. 3a and 3b depict examples and of encoding the facial image and render image using various exclusive modulation architectures.

FIG. 7 depicts an example of face reanimation using the techniques described herein.

FIG. 9b depicts an example of the training dataset generated in FIG. 9a.

FIG. 10a depicts an example of generation of a synthetic image set of a synthetic dataset.

FIG. 10b depicts an example of the synthetic dataset generated using the techniques described in FIG. 10a.

DETAILED DESCRIPTION

Overview

Figure 2A:
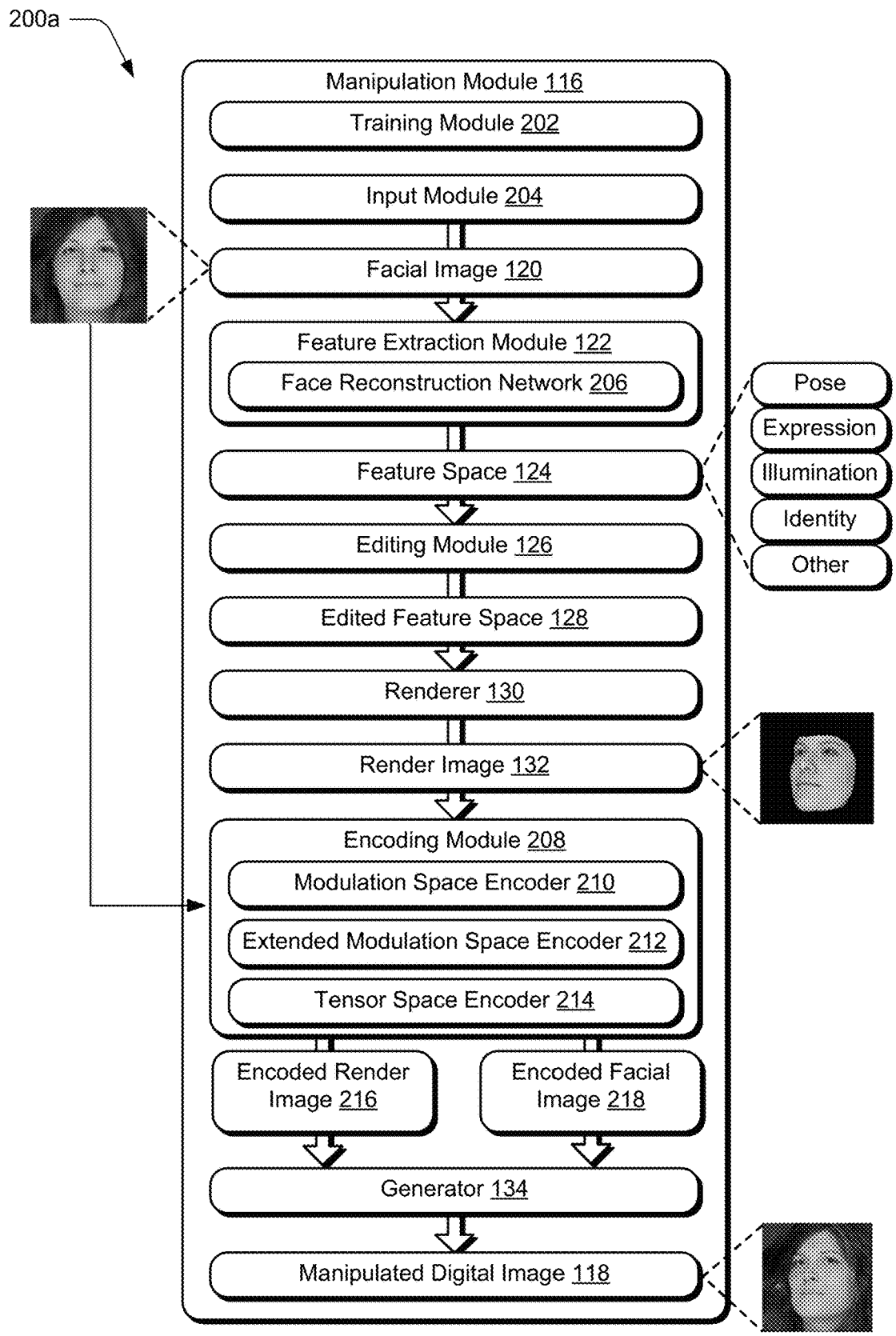
FIG. 2a depicts a system in an example implementation showing operation of a manipulation module of FIG. 1 in greater detail.

Content processing systems are often implemented for facial image synthesis tasks, e.g., generating renditions of human likenesses. One of the foremost challenges in facial image synthesis is achieving a desired effect or modification to the image while maintaining an artifact-free, identity preserved, photorealistic output. Three-dimensional morphable models (3DMM's) have long been used for face-modelling, however 3DMMs rely on low-dimensional linear representations and lack fine-details. Thus, conventional photo-rendering methods based on 3DMM's alone result in non-photorealistic output images, e.g., produce "mannequin" like representations without details such as hair, mouth cavity, wrinkles, etc.

In recent years, generative adversarial networks (GAN's) have been applied to facial image synthesis tasks. However, many conventional GAN-based techniques are trained to synthesize random faces, and thus lack meaningful control over visual features of output images or are restricted to limited influence over a single attribute. Further, conventional GAN-based techniques do not retain identity information from an input image, and thus suffer from identity loss in generated images. Moreover, these conventional techniques often use parametric vectors with limited information as control signals, which results in reduced editability as well as an increased propensity for visual artifacts.

Accordingly, techniques for identity preserved controllable facial image manipulation are described to overcome these challenges and limitations by generating a manipulated digital image based on identity information preserved from an input facial image and using a render digital image as a three-dimensional control signal. In an example, a manipulation module receives as input a facial image depicting a representation of an individual's face captured in a digital image, e.g., as input by a user through interaction with a user interface. In this example, consider a facial image that depicts a child looking straight ahead and frowning.

A feature extraction module is operable to extract a feature space from the facial image. The feature space includes one or more visual parameters that define visual attributes and characteristics of the facial image. For instance, the feature space includes an identity parameter $\alpha \in \mathbb{R}^{160}$, an, an expression parameter $\beta \in \mathbb{R}^{64}$, an illumination parameter $\gamma \in \mathbb{R}^{27}$, and a pose parameter $\delta \in \mathbb{R}^{3}$.

An editing module is configured to edit the extracted feature space in such a way as to preserve the identity parameter of the facial image. In this example, a user defines an edit to the pose and the expression of the facial image, e.g., to rotate the face to the left, and depict the child as smiling In this way, more than one visual parameter is independently edited while the identity attribute is preserved. This overcomes limitations of conventional techniques which are constrained to limited control over a single attribute.

A renderer is employed to generate a render digital image based on the edited feature space. The render digital image depicts a morphable model reconstruction of the facial image with the edit applied. Continuing the above example, the render image depicts a three-dimensional representation of the facial image with the identity preserved and portraying the child smiling with the face rotated to the left.

An encoding module encodes the facial image and the render digital image to different latent spaces of a generator, e.g., a generator of a neural network such as a generative adversarial network. In the present example, this includes encoding the render image to both an input tensor space and a modulation space of the generator and encoding the facial image to an extended modulation space. The modulation space and extended modulation space are multiplicatively combined, e.g., using element wise multiplication. In this way, photorealism and editability of the visual parameters are maximized while identity loss is minimized as further described below.

The generator is configured to map from an input source of the facial image and render digital image to an output domain of real images. In this example, the generator is trained using two strategies to optimize identity preservation and enhance editability in the manipulated digital image. A reconstruction training process trains the generator to preserve the identity parameter of the facial image in the generation of the manipulated digital image. A disentangled training process leverages a synthetic dataset to train the generator to enable editability of at least one visual parameter of the facial image in generation of the manipulated digital image.

The trained generator is thus operable to generate the manipulated digital image based on the encoded facial image and the encoded render digital image. The manipulated digital image depicts a photorealistic representation that preserves the identity of the individual included in the facial image while embodying the edit as represented by the render image. Continuing the example above, the manipulated digital image thus depicts the child from the facial image with the face rotated to the left and smiling.

Accordingly, the described techniques overcome the limitations of conventional facial image synthesis by generating a manipulated digital image based on both an identity preserved facial image and a render image including an edit. By extracting and preserving identity information from an input image, identity-loss is minimized. Further, by using render images as three-dimensional controls, the techniques described herein embed comprehensive edits at the pixel level which results in increased editability with minimal visual artifacts. This functionality is not possible using conventional techniques, which either do not support controlled editability or rely on limited information included in parametric vector control signals.

Term Examples

As used herein, the term "facial image" refers to a digital image that includes a depiction of one or more faces of one or more individuals. The facial image, for instance, is captured by a photograph or digital video. In one or more examples, the facial image includes a photorealistic facial image, an artistic facial image, an animated facial image, an abstract facial image, an anthropomorphic facial image, etc.

As used herein, the term "render image" refers to a render digital image generated by a renderer in accordance with the techniques described below. In an example, the render image depicts a morphable model reconstruction of the facial image.

As used herein, the term "visual parameters" refer to attributes and characteristics of the facial image. For instance, visual parameters include an identity parameter $\alpha \in \mathbb{R}^{160}$, an expression parameter $\beta \in \mathbb{R}^{64}$, an illumination parameter $\gamma \in \mathbb{R}^{27}$, and a pose parameter $\delta \in \mathbb{R}^{3}$. In an example, the identity parameter defines visual features associated with an individual in the facial image, e.g., face structure, eye shape, eye color, birthmarks, etc. The expression parameter represents the facial features of the individual, e.g., smiling, furrowed brow, wrinkled nose, etc. The illumination parameter describes the lighting of the facial image, e.g., soft light/hard light, contrast, color, shadows, etc. The pose parameter describes the orientation of the individual's head, e.g., with respect to a three-dimensional axis, as "roll," "pitch," and "yaw," etc.

As used herein, the term "feature space" includes one or more visual parameters included in a digital image. For instance, one or more of an identity parameter, expression parameter, illumination parameter, and pose parameter as described above such that a feature space $p=(\alpha, \beta, \gamma, \delta) \in \mathbb{R}^{254}$.

As used herein, the term "training dataset" refers to a dataset used to train the generator including a plurality of image pairs, each image pair including a facial training image and a corresponding training render image. In an example, the training dataset is used in reconstruction training.

As used herein, the term "synthetic dataset" refers to a dataset used to train the generator including sets of synthetic image pairs, each synthetic image pair including a synthetic training image and a corresponding synthetic render image. The synthetic image sets include a plurality of synthetic image pairs with a same identity parameter and different other visual parameters. In an example, the synthetic dataset is used in reconstruction training and in disentangled training.

As used herein, the term "reconstruction training" refers to a training process used to preserve an ability of the generator to preserve an identity parameter of the facial image in generation of the manipulated digital image. In an example, reconstruction training includes configuring the generator to map from an input source of a facial image and a render digital image to an output domain of real images. Reconstruction training further includes inputting an image pair from the training dataset and training the generator to reconstruct a training facial image of the image pair from the training facial image and corresponding training render image. In some implementations, the synthetic dataset is used in a similar manner in reconstruction training.

As used herein, the term "disentangled training" refers to a training process used to train the generator to enable controllable editing of one or more visual parameters of the facial image in generation of the manipulated digital image. In an example, disentangled training includes sampling first and second synthetic image pairs from the same synthetic image set, and training the generator to replicate a synthetic facial image from the first synthetic image pair based on a synthetic facial image from the second synthetic image pair and a synthetic render image from the first synthetic image pair.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the identity preserved controllable facial image manipulation techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 14.

The computing device 102 is illustrated as including a content processing system 104. The content processing system 104 is implemented at least partially in hardware of the computing device 102 to process and transform a digital image 106, which is illustrated as maintained in storage 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the content processing system 104 is also configurable as whole or part via functionality available via the network 114, such as part of a web service or "in the cloud."

An example of functionality incorporated by the content processing system 104 to process the digital image 106 is illustrated as a manipulation module 116. This module is configured to generate a manipulated digital image 118, e.g., as a transformation of a facial image 120 included in the digital image 106 automatically and without user intervention and thus controllably edit visual parameters of the facial image 120. In the illustrated example, for instance, six different manipulated digital images 118 are shown, each with varying visual attributes, e.g., pose, expression, and illumination, while maintaining the identity of the facial image 120.

To do so, a feature extraction module 122 extracts a feature space 124 from the facial image 120. The feature space includes one or more visual parameters, for instance a parameter defining an identity of the facial image 120, and at least one other visual parameter associated with visual attributes of the facial image 120 such as pose, expression, and/or illumination. This is by way of example and not limitation, and a variety of other parameters are also contemplated.

An editing module 126 is configured to generate an edited feature space 128 to preserve the identity parameter of the facial image 120 and edit at least one visual parameter of the facial image 120. For instance, the editing module 126 preserves the identity parameter while applying an edit to one or more of the pose, expression, or illumination. As further described below, in one or more examples the edit is user defined, e.g., as specified by a content creator. In other implementations, the edit is generated automatically, e.g., based on visual parameters of a reference image.

A renderer 130 is operable to generate a render image 132 depicting a morphable model reconstruction of the facial image 120 based on the edited feature space 128. Example render images 132 are illustrated in FIG. 1. Based on edits defining changes to the pose, for instance, corresponding render images are depicted as a morphable model reconstruction of the individual looking slightly downward and to the right, as well as looking slightly upward and to the left. Render images 132 for edits to expression are shown as well, illustrated as a downturned open mouth with softened eyebrows in a first example, and a closed mouth with raised eyebrows in a second example. Render images 132 based on edits to illumination are illustrated in FIG. 1 showing a "shadow" on the left side and right side of the individual's face.

A generator 134 is trained to receive as input the render image 132 and facial image 120, and from these generate the manipulated digital image 118 based on the edit. The generator 134 is a generator of a neural network, e.g., a generative adversarial network. In an example, generation of the manipulated digital image 118 includes encoding the facial image 120 and the render image 132 to different latent spaces of the generator. For instance, encoding the render image 132 to both an input tensor space and a modulation space and encoding the facial image to an extended modulation space. Continuing with this example, the modulation space and extended modulation space are multiplicatively combined.

As illustrated in FIG. 1, the manipulated digital images 118 generated by the generator preserve the identity of the facial image 120 while embodying the edit as represented by the render image 132. While in this example, edits to a single parameter at a time are depicted, in other examples multiple parameters are edited in the same manipulated digital image 118. Accordingly, the techniques described herein overcome the limitations of conventional techniques by generating manipulated digital images 118 with robust identity preservation, precise and controllable editing over multiple discrete visual attributes, and enhanced photorealism.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Identity Preserved Controllable Facial Image Manipulation

Figure 2B:
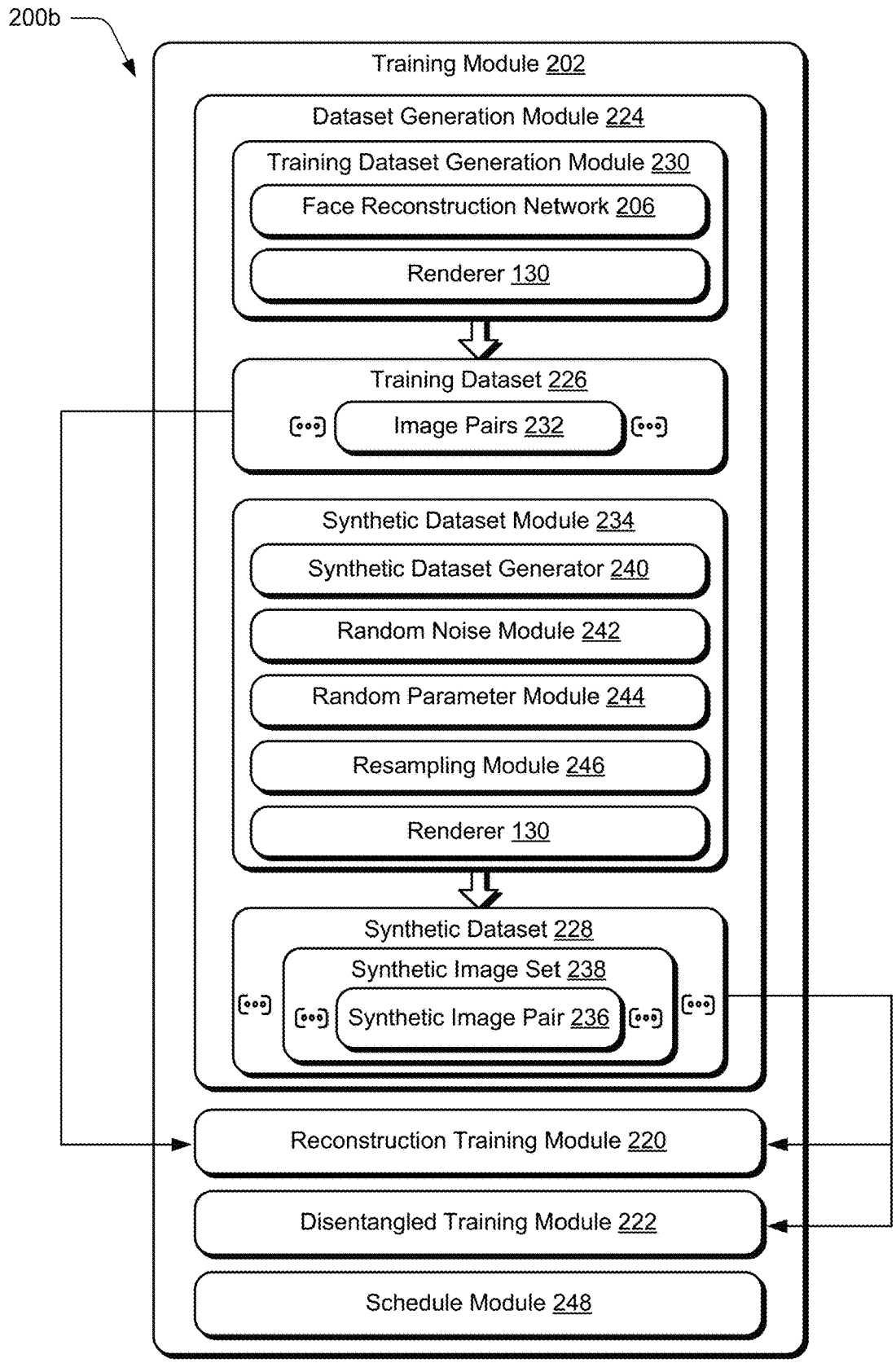
FIG. 2b depicts a system showing operation of a training module of the manipulation module of FIG. 2a in greater detail.
Figure 3B:
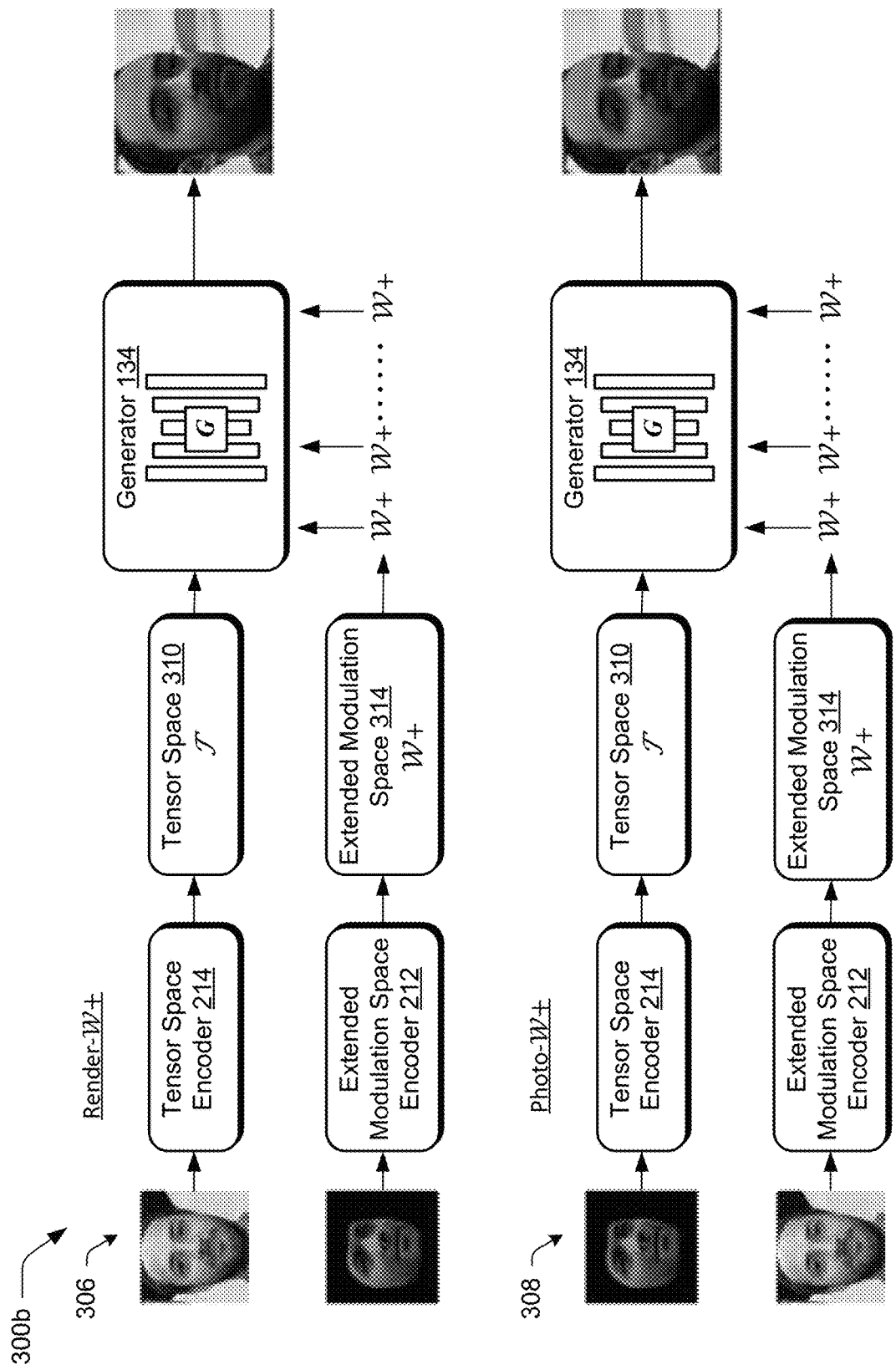
Figure 4A:
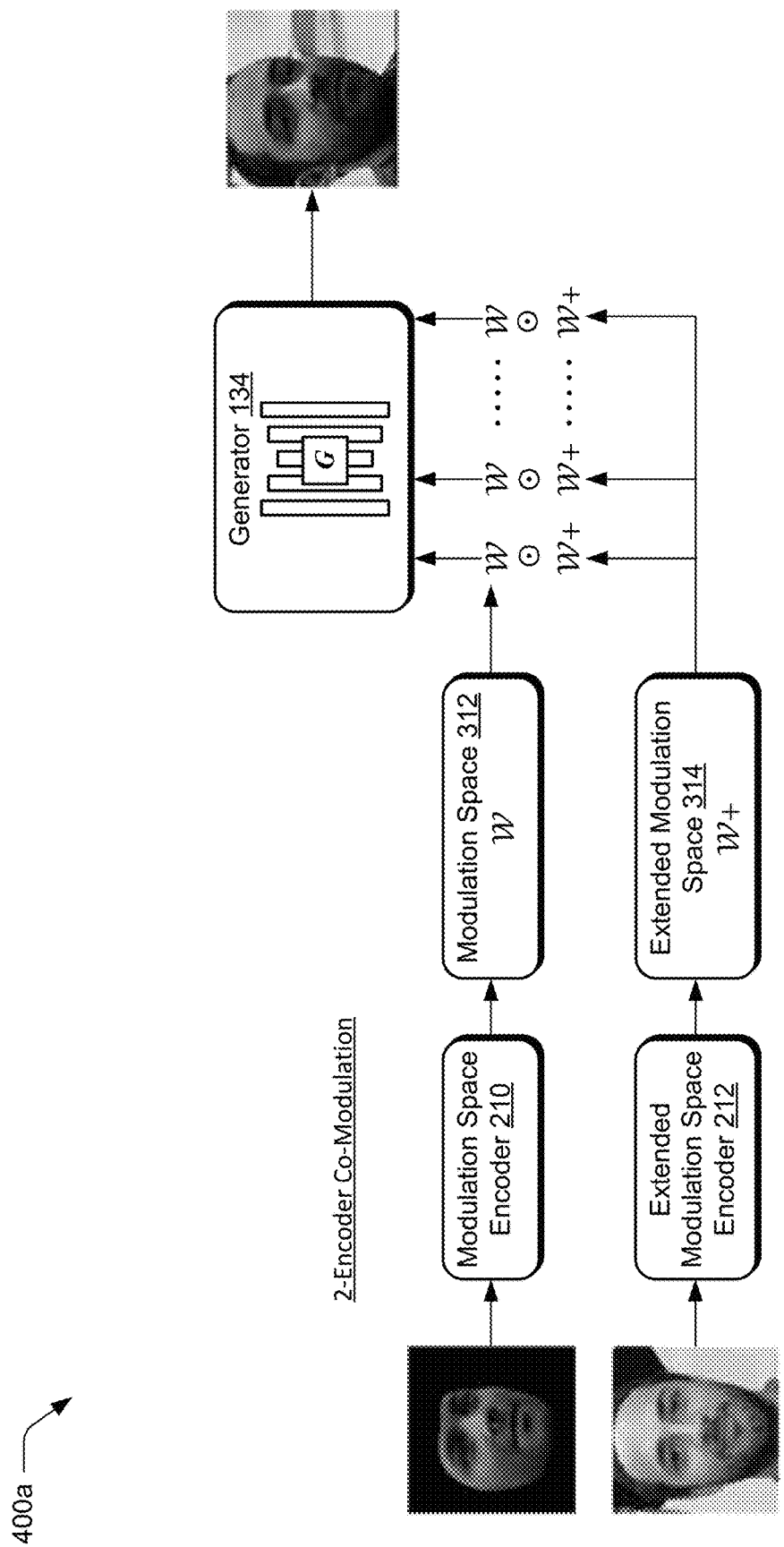
FIG. 4a depicts an example of encoding the facial image and render image using two-encoder co-modulation in which the modulation space and extended modulation space are multiplicatively combined.
Figure 4B:
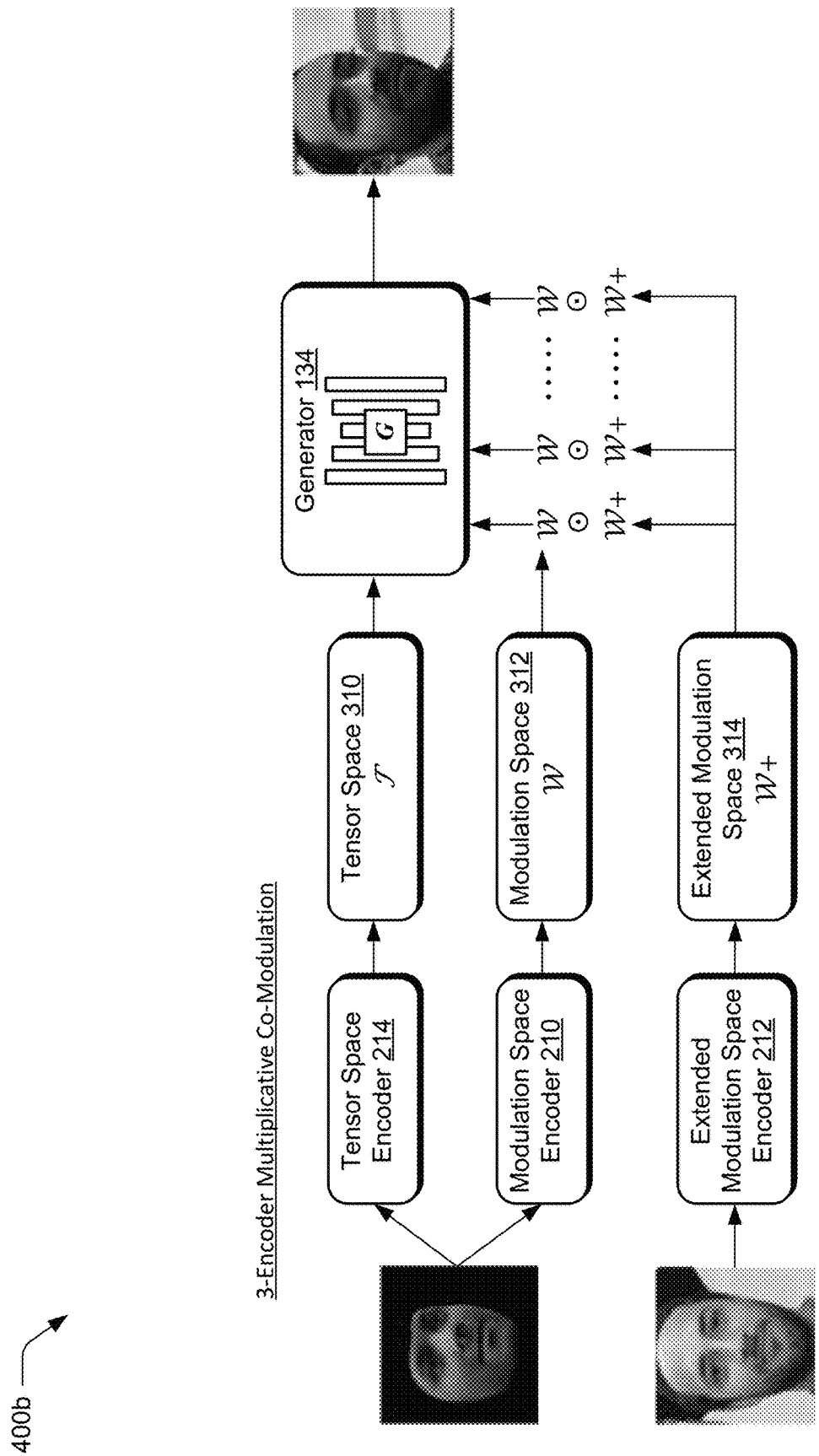
FIG. 4b depicts an example of encoding the facial image and render image using three-encoder multiplicative co-modulation.
Figure 5:
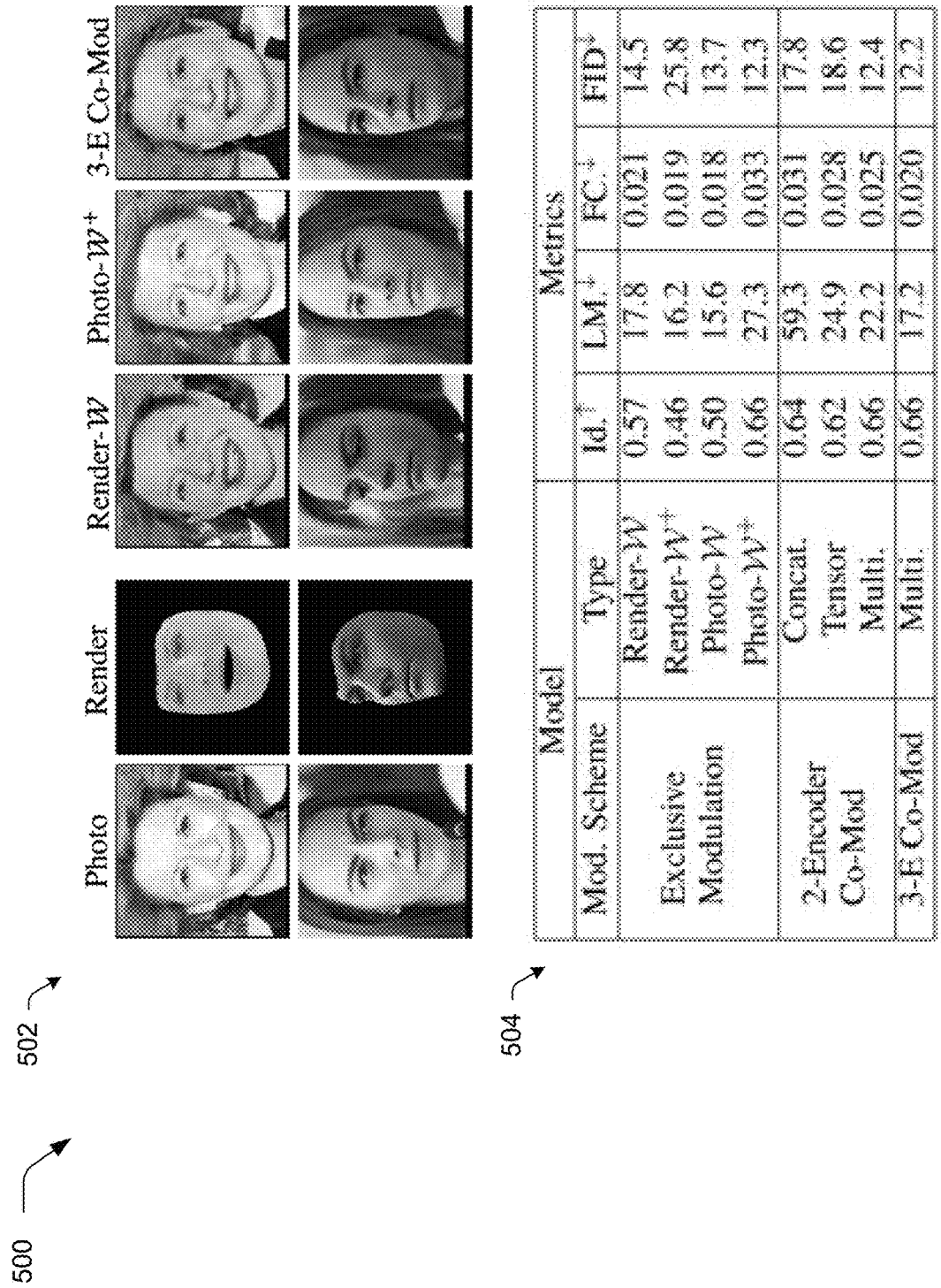
FIG. 5 illustrates a representation of a comparison between the various architectures.
Figure 6A:
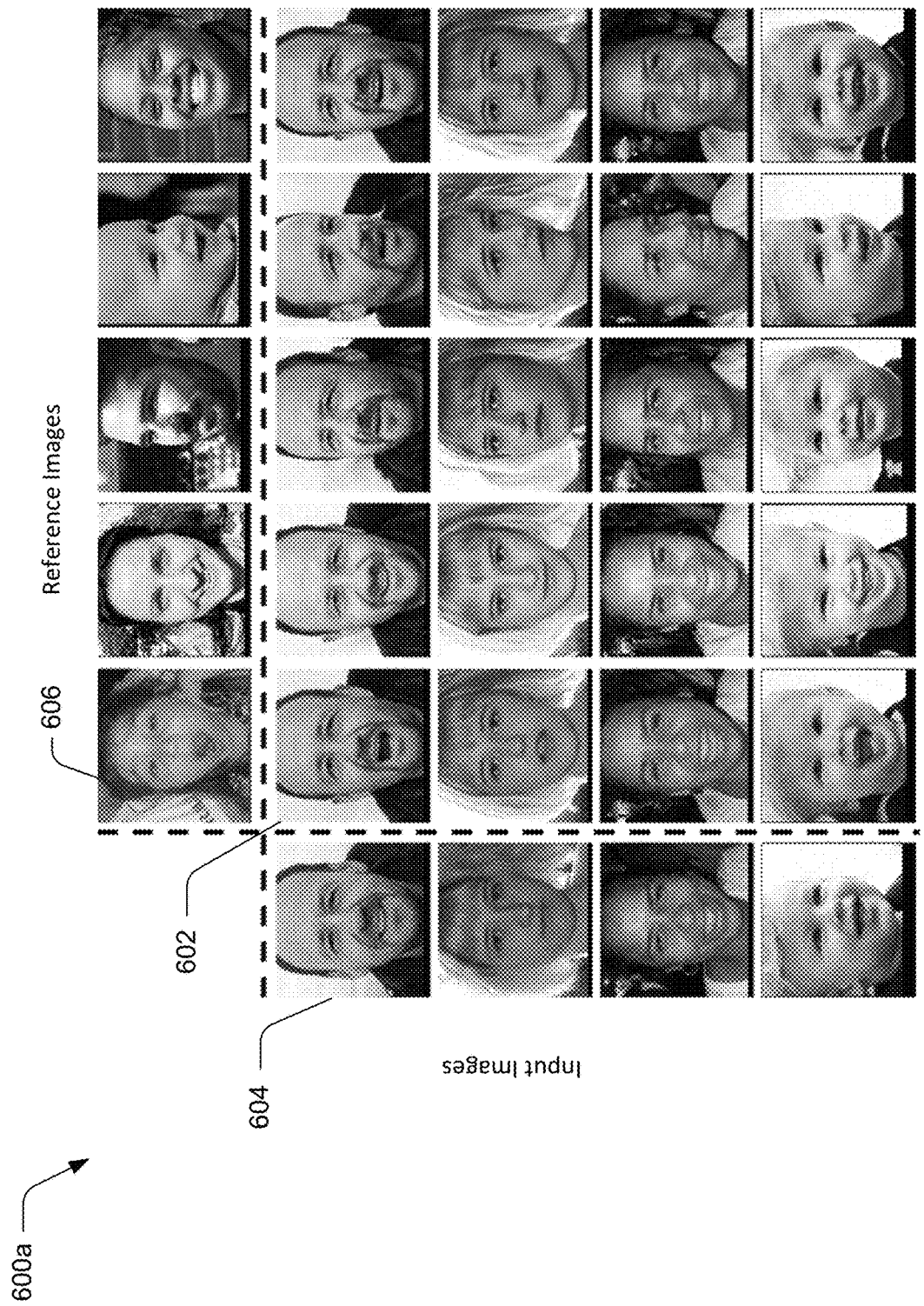
FIGS. 6a and 6b depict examples and of reference-based synthesis.
Figure 6B:
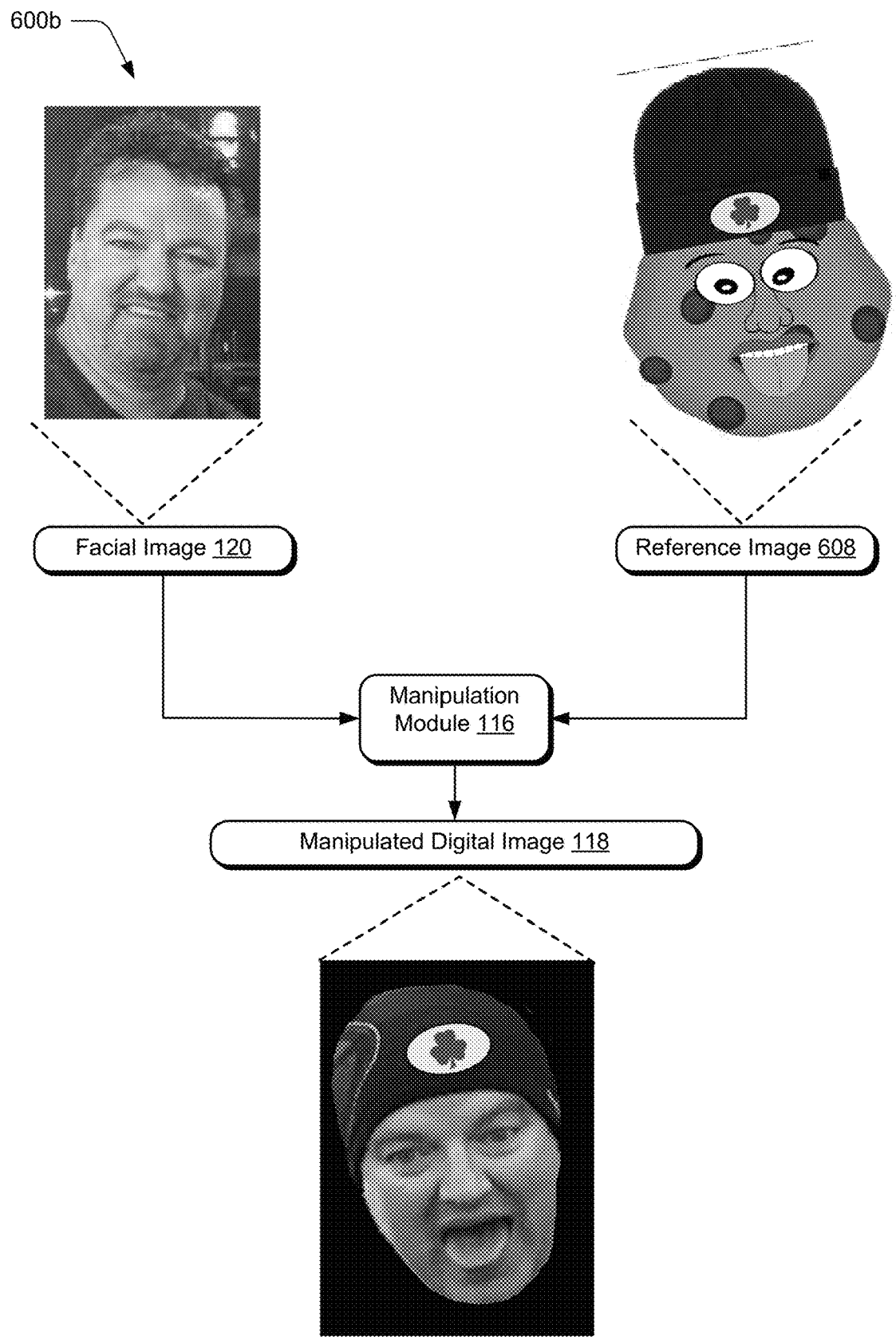
Figure 8:
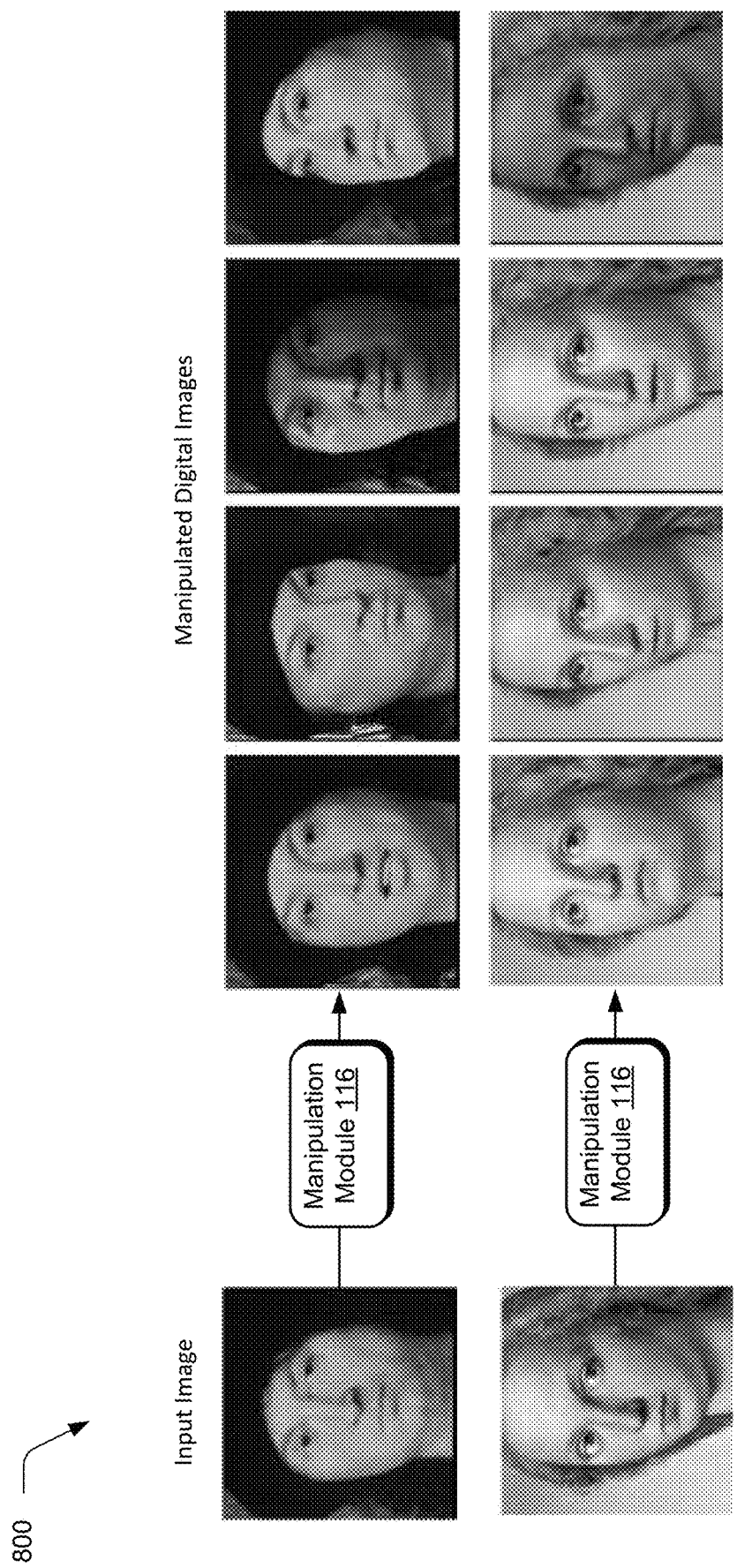
FIG. 8 depicts an example of artistic image manipulation using the techniques described herein.
Figure 9A:
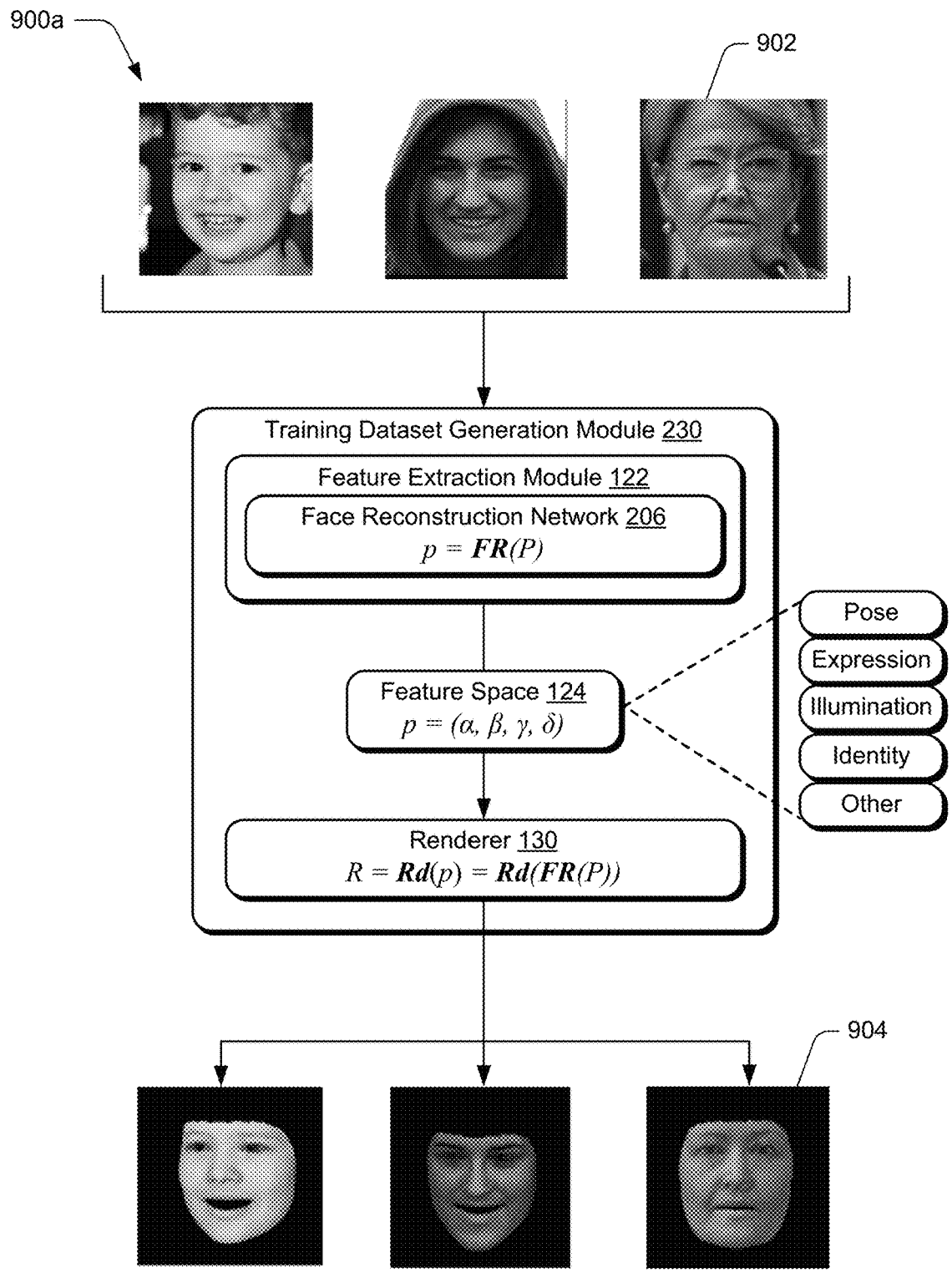
FIG. 9a depicts an example of generation of a training dataset.
Figure 9B:
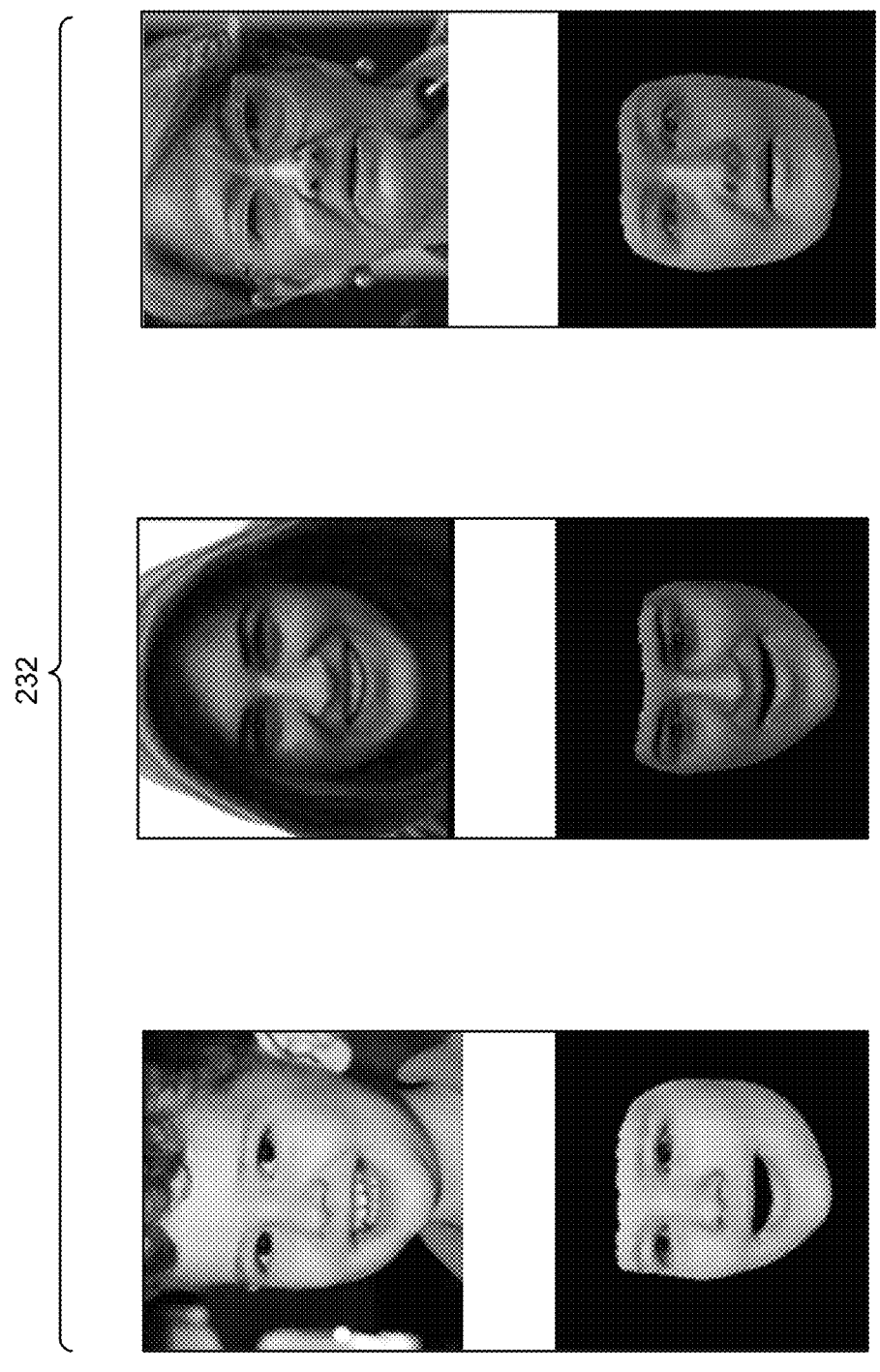
Figure 10B:
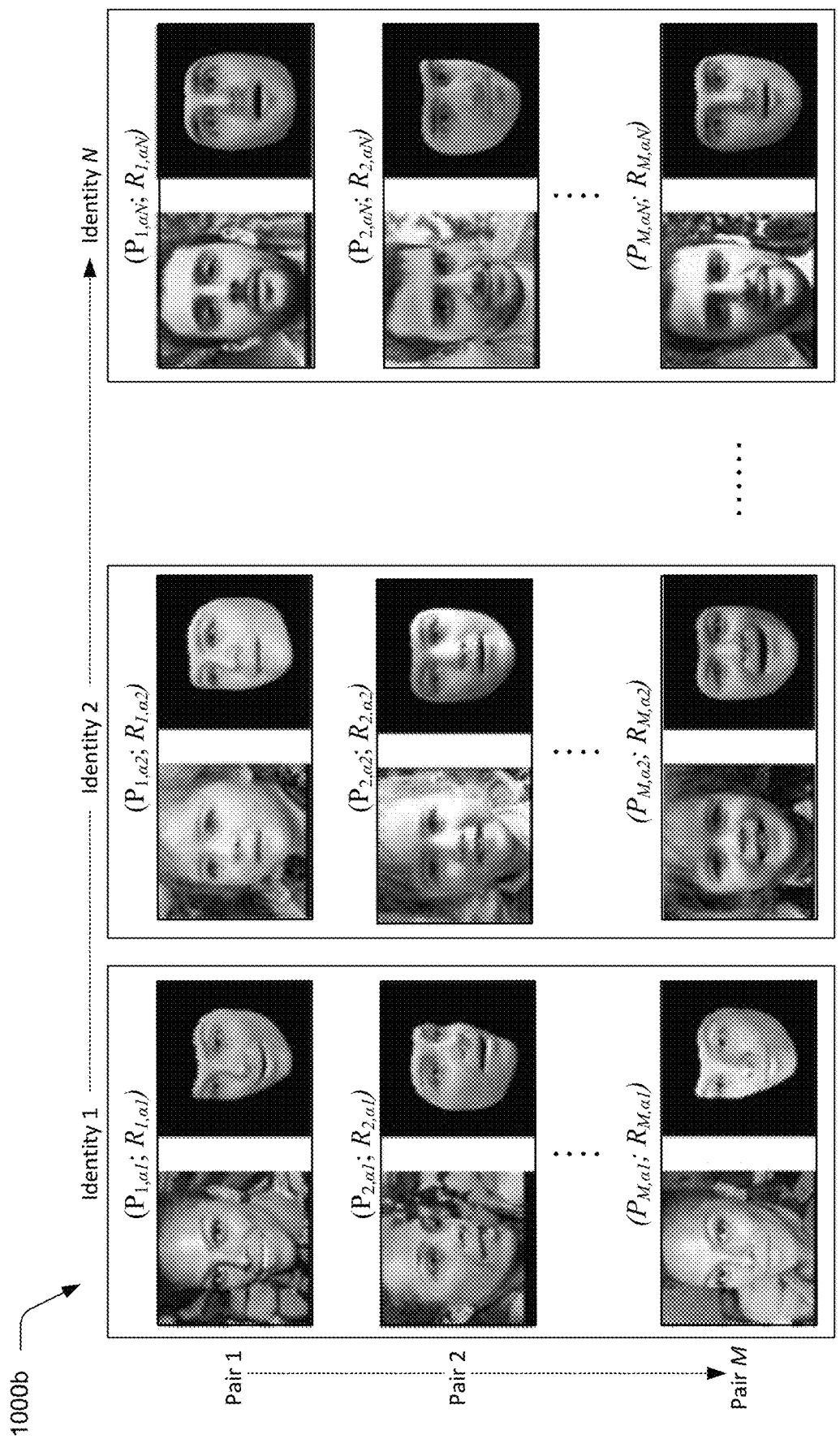
Figure 11:
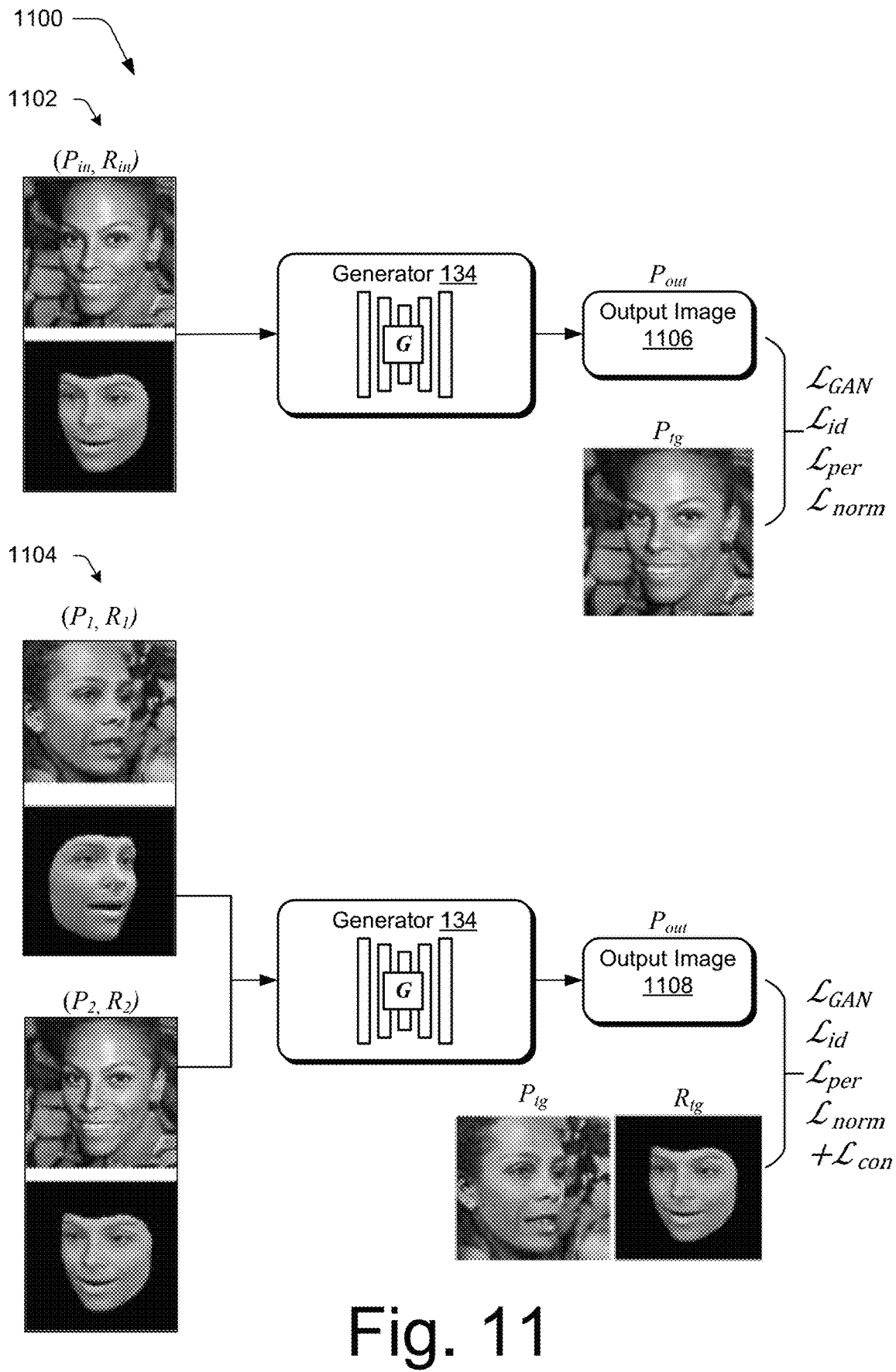
FIG. 11 depicts an example of training the generator using reconstruction training and disentangled training.
Figure 12:
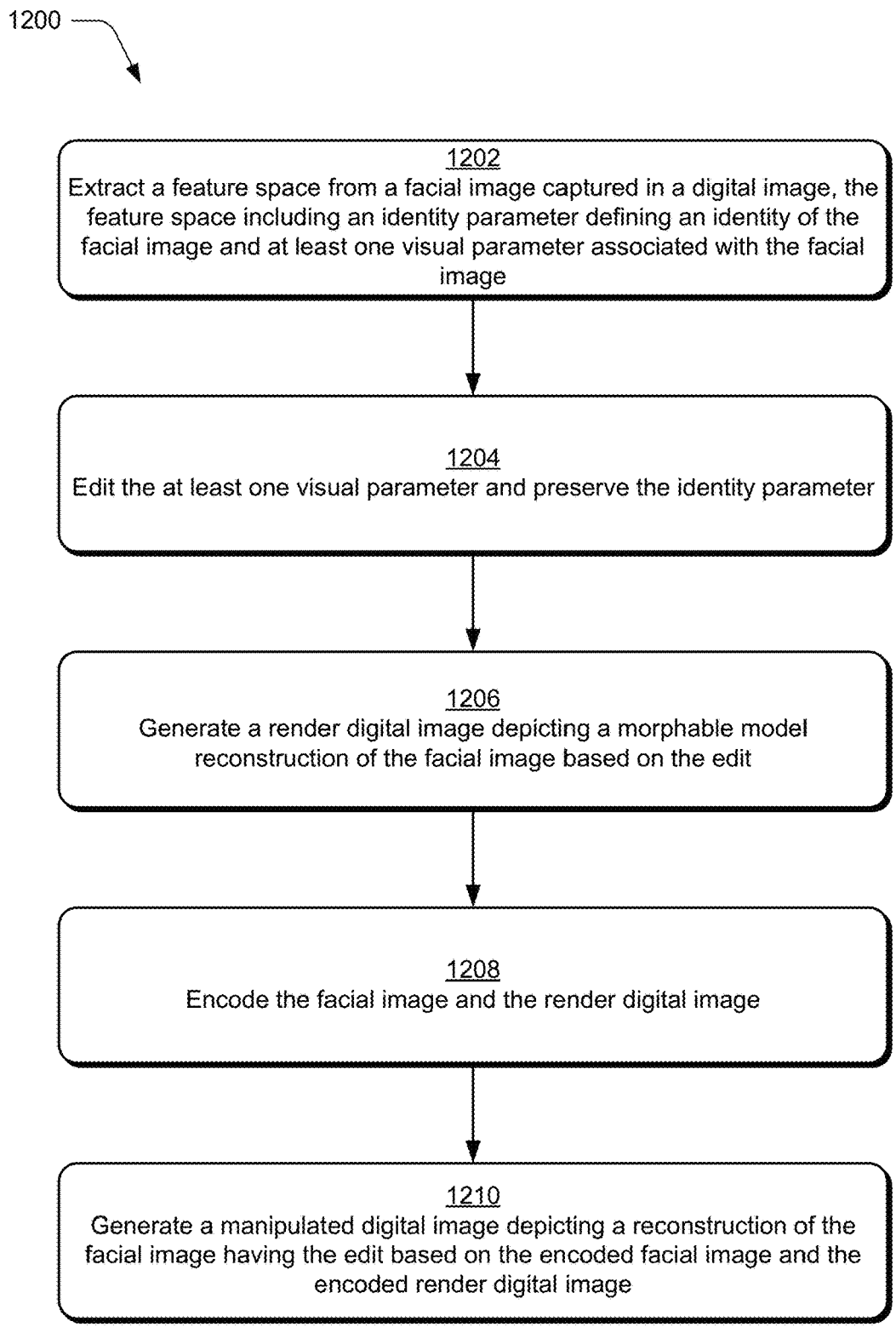
FIG. 12 depicts a procedure in an example implementation of identity preserved controllable facial image manipulation.
Figure 13:
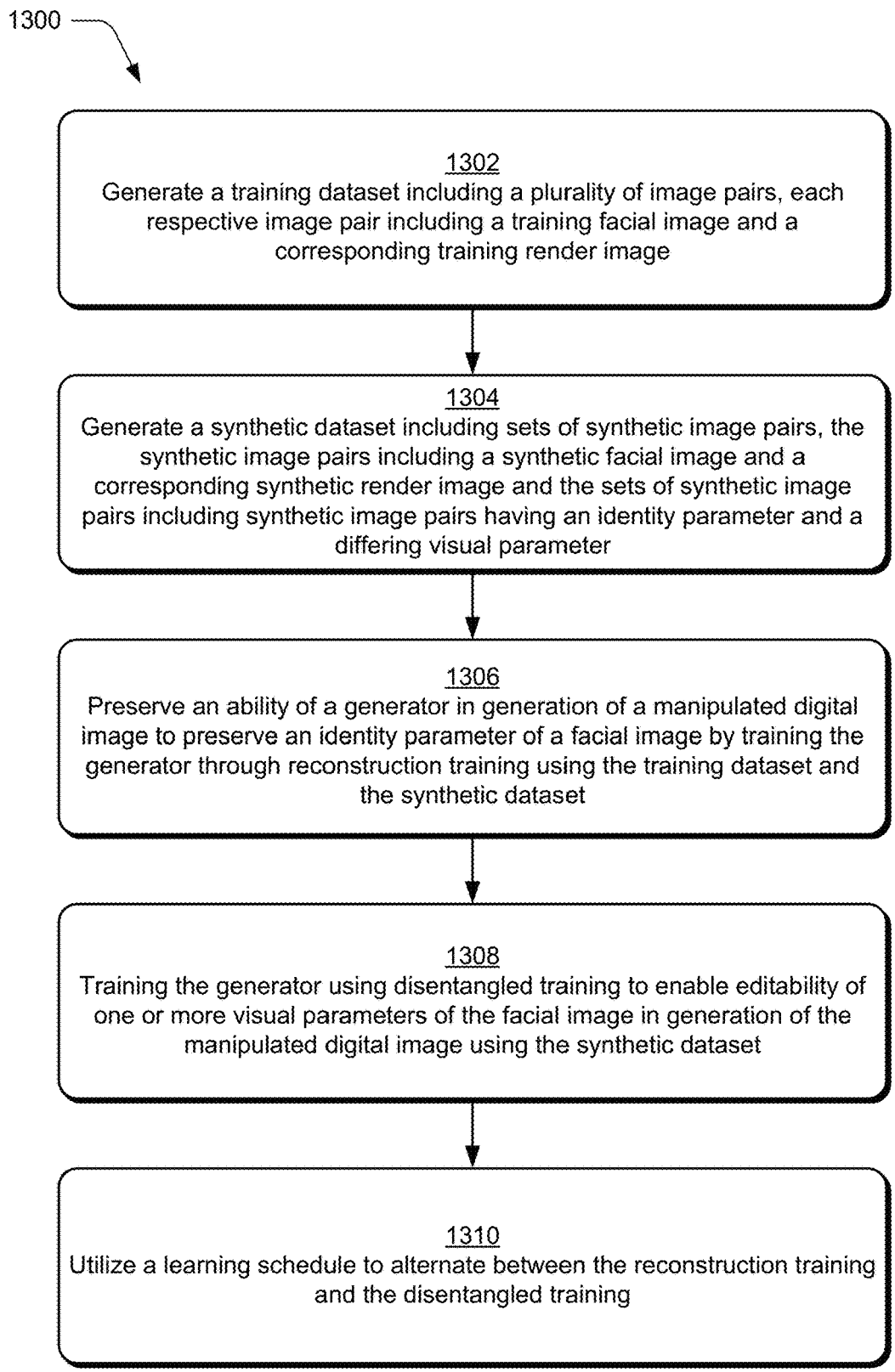
FIG. 13 depicts a procedure in an example implementation of training a generator for use in identity preserved controllable facial image manipulation.

FIG. 2a depicts a system 200a in an example implementation showing operation of a manipulation module 116 of FIG. 1 in greater detail. FIG. 2b depicts a system 200b showing operation of a training module 202 of the manipulation module 116 of FIG. 2a in greater detail. FIGS. 3a and 3b depict examples 300a and 300b of encoding the facial image 120 and render image 132 using various exclusive modulation architectures. FIG. 4a depicts an example 400a of encoding the facial image 120 and render image 132 using two-encoder co-modulation in which the modulation space and extended modulation space are multiplicatively combined. FIG. 4b depicts an example 400b of encoding the facial image 120 and render image 132 using three-encoder multiplicative co-modulation. FIG. 5 illustrates a representation 500 of a comparison between the various architectures. FIGS. 6a and 6b depict examples 600a and 600b of reference-based synthesis. FIG. 7 depicts an example 700 of face reanimation using the techniques described herein. FIG. 8 depicts an example 800 of artistic image manipulation using the techniques described herein. FIGS. 9a and 9b depict examples 900a and 900b of generation of a training dataset. FIG. 10a depicts an example 1000a of generation of a synthetic image set of a synthetic dataset. FIG. 10b depicts an example 1000b of the synthetic dataset generated using the techniques described in FIG. 10a. FIG. 11 depicts an example 1100 of training the generator using reconstruction training and disentangled training. FIG. 12 depicts a procedure 1200 in an example implementation of identity preserved controllable facial image manipulation. FIG. 13 depicts a procedure 1300 in an example implementation of training a generator for use in identity preserved controllable facial image manipulation.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-13.

As illustrated in FIG. 2a, the manipulation module 116 includes a training module 202 that is operable to train the generator 134 to perform facial image editing, for instance by generating a manipulated digital image 118 from a respective facial image and a respective render digital image. In the following example, the generator 134 is pretrained, e.g., in accordance with the training methods discussed below with respect to FIGS. 2b, 9a, 9b, 10a, 10b, 11, and 13.

To begin, an input module 204 is employed to receive as input a digital image 106 including one or more facial images 120. For instance, the facial image 120 is received as a user input via a user interface 110. The one or more facial images 120 depict a face of an individual as captured by a photograph or digital video. In one example, the facial image 120 depicts an artistic image as further described below with respect to FIG. 8. In another example, the facial image is extracted from a virtual digital image, e.g., from a virtual representation of an individual. Other examples are also considered, for instance animated facial images, abstract facial images, anthropomorphic facial images, etc. In this example, the facial image 120 depicts a woman looking straight ahead.

A feature extraction module 122 is operable to extract a feature space 124 from the facial image 120 captured in the digital image 106. The feature space 124 includes an identity parameter defining an identity of the facial image 120 and at least one visual parameter associated with the facial image 120 (block 1202). For instance, one or more of a pose, expression, or illumination. In this example, $\alpha \in \mathbb{R}^{160}$ represents identity, $\beta \in \mathbb{R}^{64}$ represents expression, $\gamma \in \mathbb{R}^{27}$ represents illumination, and $\delta \in \mathbb{R}^{3}$ represents pose. This is by way of example and not limitation, and a variety of other parameters are also considered.

Continuing with the example, the feature extraction module 122 includes a face reconstruction network 206 to extract the feature space 124. The face reconstruction network 206 is operable to approximate the visual parameters of the facial image 120. Accordingly, in an example where FR represents the face reconstruction network 206 and $P \in \mathbb{R}^{H \times W \times 3}$ represents the facial image 120, the feature space 124 for the facial image 120 is thus defined as $p=FR(P)=(\alpha_1, \beta_1, \gamma_1, \delta_1) \in \mathbb{R}^{254}$.

An editing module 126 is configured to edit the at least one visual parameter and preserve the identity parameter of the facial image 120 (block 1204). For instance, this includes generating an edited feature space 128 by editing one or more of the pose, illumination, or expression parameters. In this example, the editing module 126 edits the pose to depict the individual facing to the right. While in this example a single edit to the pose is illustrated, in other examples multiple parameters are edited in the same manipulated digital image 118. Accordingly, the techniques described herein overcome the limitations of conventional techniques which are constrained to a limited control over a single attribute.

In some implementations, an edit is received via a user input, e.g., from a content creator specifying an edit to one or more of the pose, illumination, or expression. In other implementations, the editing module 126 generates the edit automatically and without user intervention, such as based on a reference image as further described below with respect to FIGS. 6a and 6b. In another implementation, the edit includes a series of edits to form an animation of the facial image 120 as further described below with respect to FIG. 7. Following the above convention, the edited feature space 128 is denoted $\hat{p}$ such that $\hat{p}=\alpha_1, \beta_2, \gamma_2, \delta_2$ where one or more of $\beta_2, \gamma_2, \delta_2$ are different than $\beta_1, \gamma_1, \delta_1$. In the present example, because the edit is to the pose parameter, $\delta_2 \neq \delta_1$. In this way, edits to the visual parameters of the facial image 120 are controlled without compromising the identity parameter.

A renderer 130 is operable to generate a render image 132 depicting a morphable model reconstruction of the facial image 120 based on the edit (block 1206). For instance, as specified by the edited feature space 128. As illustrated in FIG. 2a, the render image 132 includes a facial representation of the edit (e.g., a pose rotation to the right) without image details such as hair, facial lines, etc. Thus, the render image 132 embodies the edit at the pixel level in a three-dimensional representation of the facial image 120.

Continuing the above example, the render image 132 is represented as R and is defined as R=Rd($\hat{p}$) where Rd represents the renderer 130. In this way, the renderer 130 is operable to embed the desired manipulations (e.g., edits to the pose, expression, and illumination) into an identity-preserved rendered facial representation at a pixel level. This overcomes the limitations of conventional techniques that rely on parametric vector inputs which have limited editability and are subject to artifacts, particularly at large pose rotations. By providing three-dimensional signals in the form of render images, the techniques described herein expand the range of editability and reduce the incidence of such artifacts.

An encoding module 208 is operable to encode the facial image 120 and the render image 132 (block 1208). For instance, by using one or more encoders to encode the render image 132 and the facial image 120 to different latent spaces of the generator 134. In an example, there are three different latent spaces of the generator 134 for information encoding, namely an input tensor space $\mathcal{T} \in \mathbb{R}^{512 \times 4 \times 4}$, a modulation space $\mathcal{W} \in \mathbb{R}^{512}$, and an extended modulation space $\mathcal{W}_+ \in \mathbb{R}^{512 \times L}$ where L is a number of layers in the generator 134.

Accordingly, there are different encoders that correspond to the different latent spaces, e.g., a modulation space encoder 210, an extended modulation space encoder 212, and a tensor space encoder 214. In some implementations, the modulation space encoder 210 and the tensor space encoder 214 are based on a ResNet18 structure, and the extended modulation space encoder 212 is an 18-layer PSP encoder.

FIGS. 3a and 3b depict examples 300a and 300b of encoding the facial image 120 and render image 132 using various exclusive modulation architectures in first, second, third and fourth stages 302, 304, 306, and 308 respectively. Exclusive modulation describes encoding either the render image 132 or the facial image 120 to a tensor space 310 and encoding the other to either a modulation space 312 or extended modulation space 314. For instance, first stage 302 of FIG. 3a illustrates a Render-$\mathcal{W}$ exclusive modulation architecture in which the facial image 120 is encoded by the tensor space encoder 214 to the tensor space 310. Accordingly, the render image 132 is encoded to the modulation space 312, e.g., where R is encoded into a one-dimensional vector $\mathcal{W} \in \mathbb{R}^{512}$ which is input to the generator as a modulation signal. Similarly, second stage 304 of FIG. 3a illustrates a Photo-$\mathcal{W}$ exclusive modulation architecture in which the render image 132 is encoded by the tensor space encoder 214 to the tensor space 310 and the facial image 120 is encoded by the modulation space encoder 210 to the modulation space 312.

In some examples, the modulation space 312 is substituted for an extended modulation space 314, and the extended modulation space encoder 212 is operable to encode either the render image 132 or the facial image 120 to the extended modulation space 314 thereby supporting varied layer modulation. For example, third stage 306 of FIG. 3b illustrates a Render-$\mathcal{W}_+$ exclusive modulation architecture in which the facial image 120 is encoded by the tensor space encoder 214 to the tensor space 310 and the render image 132 is encoded to the extended modulation space 314. Fourth stage 308 of FIG. 6a illustrates a Photo-$\mathcal{W}_+$ exclusive modulation architecture in which the render image 132 is encoded by the tensor space encoder 214 to the tensor space 310 and the facial image 120 is encoded by the extended modulation space encoder 212 to the extended modulation space 314.

As further discussed below with respect to FIG. 5, generally, encoding the render image 132 to the modulation space 312 improves editability, while encoding the facial image 120 to the extended modulation space 314 enhances identity preservation. Accordingly, in some implementations a co-modulation architecture is utilized, in which the render image 132 is encoded to the modulation space 312 and the facial image 120 is encoded to the extended modulation space 314. The modulation space 312 and the extended modulation space 314 are then combined, e.g., using multiplication, concatenation, or tensor transformation.

For instance, FIG. 4a depicts an example 400a of encoding the facial image 120 and render image 132 using two-encoder co-modulation in which the modulation space 312 and extended modulation space 314 are multiplicatively combined, e.g., using element-wise multiplication. In this example, the modulation space encoder 210 encodes the render image 132 to the modulation space 312 where $\mathcal{W} \in \mathbb{R}^{512}$ and the extended modulation space encoder 212 encodes the facial image 120 to the extended modulation space 314 where $\mathcal{W}_+ \in \mathbb{R}^{512 \times L}$ and L is the number of layers in the generator. In this example, the modulation signal for a given layer l is obtained by $\mathcal{W}_l^+ \odot \mathcal{W}$ where $\mathcal{W}_l^+ \in \mathbb{R}^{512}$ is the l-th column of $\mathcal{W}_+$ and $\odot$ is an element-wise multiplication operator.

Further, additionally encoding the render image 132 to the tensor space 310 improves a trade-off between identity preservation and editability. Accordingly, some implementations utilize a three-encoder co-modulation architecture. For instance, FIG. 4b depicts an example 400b of encoding the facial image 120 and render image 132 using three-encoder multiplicative co-modulation. In this example, the render image 132 is encoded by the tensor space encoder 214 to the tensor space 310, as well as additionally encoded by the modulation space encoder 210 to the modulation space 312. The facial image 120 is encoded to the extended modulation space 314. The extended modulation space 314 and the modulation space are then multiplicatively combined using element-wise multiplication. In this way, the three-encoder multiplicative co-modulation architecture optimizes trade-offs between editing controllability, identity preservation, and photorealism.

FIG. 5 illustrates a representation 500 of an example comparison between the various architectures in first and second stages 502 and 504. First stage 502 illustrates a visual comparison between manipulated digital images 118 generated using a Render-$\mathcal{W}$, a Photo-$\mathcal{W}$+, and the three-encoder co-modulation architecture as described above. In the example, the generator 134 uses each respective architecture to generate a manipulated digital image 118 from the photo (i.e., facial images 120) and render images 132.

As illustrated, there is a visual difference between the resulting manipulated digital images 118. For instance, the Render-$\mathcal{W}$ architecture displays good editability, however has reduced identity preservation. On the other hand, the Photo-$\mathcal{W}$+ exhibits strong identity preservation, however, has reduced editability, e.g., has a distorted illumination. The three-encoder co-modulation architecture leverages the advantages of both, showing improved identity preservation and editability without the trade-offs or artifacts.

Second stage 504 illustrates an example comparison between the performance of the eight different architectures described above. In this example, the column labelled "Id." represents identity preservation (higher value is better), editability is gauged by "LM" (landmark similarity, in which a lower value is better) and "FC" (face content similarity, in which a lower value is better), and photorealism is measured by "FID" (lower value is better). As noted above, the architectures that encode the facial image 120 to the extended modulation space 314 show a high degree of identity preservation, while the architectures that encode the render image 132 to the modulation space 312 provide improved editability. Accordingly, the co-modulation techniques that both encode the facial image 120 to the extended modulation space 314 and the render image 132 to the modulation space 312 show the overall best performance. Further, in the co-modulation architectures, multiplicative combination is generally superior to concatenation or tensor transformation.

In an example, selection of the encoding architecture is dependent on the task or goals of content creator. For instance, Photo-$\mathcal{W}$ exclusive modulation demonstrates strong editability, albeit with the trade-off of weaker identity preservation and lower photorealism. Using the three-encoder multiplicative co-modulation architecture achieves a robust overall performance in terms of identity preservation, editability, and photorealism. Regardless of the selected architecture, the encoding module 208 is thus configured to encode the facial image 120 and render image 132, e.g., as an encoded render image 216 and an encoded facial image 218.

The generator 134 is implemented to generate a manipulated digital image 118 depicting a reconstruction of the facial image 120 having the edit based on the encoded facial image 218 and the encoded render image 216 (block 1210). In one or more examples, the generator 134 is a generator of a neural network, e.g., a generative adversarial network. In some implementations, the generator 134 leverages use of a StyleGAN generator to generate the manipulated digital image 118. For instance, a StyleGAN generator as described by Tero Karras et al., *Analyzing and Improving the Image Quality of StyleGAN*. In Proceedings of the IEEE/CVF Conference on Computer Vision and Pattern Recognition, pages 8110-8119, (2020). In an example, the StyleGAN generator is modified to implement one of the above-described modulation architectures to perform the above-described techniques.

The manipulated digital image 118 depicts a photorealistic representation that preserves the identity of individual included in the facial image 120 while embodying the edit as represented in the render image 132. In some examples, the manipulated digital image 118 depicts edits to other objects included in the facial image, e.g., glasses, jewelry, hats, rigid bodies, etc. Continuing the example above, the manipulated digital image 118 thus depicts the woman from the facial image 120 with her face rotated to the right. Accordingly, the described techniques overcome the limitations of conventional facial image synthesis by generating a manipulated digital image 118 based on both an identity preserved facial image and a render image including a comprehensive edit.

FIGS. 6a and 6b depict examples 600a and 600b of reference-based synthesis. In these examples, the edit is generated based on a reference image e.g., a reference facial image with a different identity parameter than the facial image 120. To do so, the feature extraction module 122 is operable to extract a reference feature space from the reference image such as pose, expression, and illumination parameters of the reference image. The editing module 126 is employed to generate the edited feature space 128 to include the identity parameter from the facial image 120, while the one or more other visual parameters are defined as the pose, expression, and illumination parameters of the reference image, for instance $\hat{p}=\alpha_1$, $\beta_{reference}$, $\gamma_{reference}$, $\delta_{reference}$.

In accordance with the techniques describes above, the generator 134 synthesizes a manipulated digital image 118 that includes the identity of the facial image 120 and visual attributes based on the reference image. In an example from FIG. 6a, a manipulated digital image 118 shown at 602 embodies the identity of the facial image 120 shown at 604, and the visual parameters of the reference image shown at 606. Thus, the man represented in the manipulated digital image 118 includes his identity, with visual features obtained from the reference image of the young girl, e.g., open mouth, lighting conditions, face rotation, etc.

FIG. 6b depicts a further example of reference-based synthesis in which a reference image 608 is an abstract image. In one or more examples, the techniques described above generate manipulations for other objects included in the facial image and/or the reference image, e.g., glasses, jewelry, hats, rigid bodies, etc. In the illustrated example, the edit is defined based on visual parameters extracted from the abstract reference image. For instance, the open mouth with tongue extended, warped eyes, off-axis rotation, and hat present on the image of the anthropomorphic cookie. Thus, the generator is operable to incorporate these visual features in a manipulated digital image 118 of the man.

FIG. 7 depicts an example 700 of face reanimation using the techniques described herein. As noted above, in some examples the edit includes a series of edits. Accordingly, the generator 134 is configured to generate a series of manipulated digital images 118 based on the series of edits. In this way, the manipulation module 116 is further operable to form an animation of the facial image 120. As illustrated in FIG. 7, the series of edits are configured to generate an animation of the woman speaking and moving her head.

FIG. 8 depicts an example 800 of artistic image manipulation using the techniques described herein. In this example, the facial images are artistic images, e.g., paintings of individuals. As illustrated, the techniques above are applicable to the artistic images to generate manipulated digital images 118 with varying pose, expression, and illumination while retaining identity. Thus, this example demonstrates the generalizability of the above techniques to a variety of facial images 120.

Training the Generator

As noted above, the training module 202 is operable to train the generator 134 to perform facial image editing. For instance, to generate the manipulated digital image 118 from the facial image 120 and the render image 132 in accordance with the techniques described above. Generally, the training includes two training processes. For instance, the training module 202 includes a reconstruction training module 220 to implement reconstruction training and a disentangled training module 222 to implement disentangled training.

Reconstruction training is leveraged to preserve an ability of the generator 134 to preserve the identity parameter of the facial image 120 as further described below. Disentangled training is employed to enable editability of the one or more visual parameters of the facial image 120 in generation of the manipulated digital image 118 as further described below. In one or more examples, the disentangled training and reconstruction training include training the generator 134 against a discriminator, e.g., of a generative adversarial network. For instance, the generator 134 competes against the discriminator in a zero-sum game framework to improve the ability of the generator 134 to complete an assigned task.

The training module 202 also includes a dataset generation module 224 to generate training data, such as a training dataset 226 and a synthetic dataset 228 to support the two types of training processes. For instance, a training dataset generation module 230 is configured to generate a training dataset 226 including a plurality of image pairs 232, each respective image pair 232 including a training facial image and a corresponding training render image (block 1302).

To do so, as shown in example 900a of FIG. 9a, the training dataset generation module 230 is implemented to receive as input a plurality of training facial images, an example of which is shown at 902. In this example, the plurality of training facial images is sourced from a facial image dataset, such as an FFHQ dataset. The feature extraction module 122 utilizes a face reconstruction network 206 to extract a feature space 124 from each of the plurality of training facial images. In this example, "P" is an individual training facial image, "FR" is the face reconstruction network 206, and the feature space 124 is represented as "p". Accordingly, the feature space 124 for a given training facial image is defined as $p=FR(P)=(\alpha, \beta, \gamma, \delta)$ where $\alpha \in \mathbb{R}^{160}$ represents identity, $\beta \in \mathbb{R}^{64}$ represents expression, $\gamma \in \mathbb{R}^{27}$ represents illumination, and $\delta \in \mathbb{R}^{3}$ represents pose.

The training dataset generation module 230 employs the renderer 130 to generate a corresponding training render image for each respective training facial image. As illustrated, the training render image shown at 904 corresponds to the training facial image shown at 902. Continuing the above example, the training render image is represented as "R" and the renderer 130 is represented as "Rd". Accordingly, a respective training render image is defined as $R=Rd(p)=Rd(FR(P))$. FIG. 9b depicts an example 900b of the training dataset generated in FIG. 9a. Each of the illustrated image pairs 232 include a training facial image and a training render image generated in accordance with the above techniques.

Further, the dataset generation module 224 includes a synthetic dataset module 234 to generate a synthetic dataset 228 including sets of synthetic image pairs 236, e.g., synthetic image sets 238. Each synthetic image set 238 includes two or more synthetic image pairs 236 that include a synthetic facial image and a corresponding synthetic render image. The synthetic image sets 238 include synthetic image pairs 236 having an identity parameter and a differing visual parameter (block 1304). In this way, the synthetic dataset 228 enables the generator 134 to train on images with a same identity but with varying other visual parameters, e.g., pose, expression, and illumination, to facilitate accurate and controllable editability of individual parameters in the generation of the manipulated digital image 118.

For instance, FIG. 10a depicts an example 1000a of generation of a single synthetic image set 238 including three synthetic image pairs 236. To do so, the synthetic dataset module 234 employs a synthetic dataset generator 240 that is trained to synthesize a digital image based on an input noise value and parameter values. In an example, the synthetic dataset generator 240 utilizes a generator of a DiscoFaceGAN described by Yu Deng et al., *Disentangled and Controllable Face Image Generation Via 3d Imitative-Contrastive Learning*. In Proceedings of the IEEE/CVF Conference on Computer Vision and Pattern Recognition, pages 5154-5163, (2020). Accordingly, the digital images output by the synthetic dataset generator 240 are randomly generated photorealistic synthetic images. In other words, virtual representations of a non-existent "individuals."

In the illustrated example, a random noise module 242 is operable to randomly generate a noise vector $n \in \mathbb{R}^{32}$ and a random parameter module 244 is operable to randomly sample a first feature space such that $p_1=\alpha_1, \beta_1, \gamma_1, \delta_1$. From $p_1$ and n, the synthetic dataset generator 240, represented as $G_d$, synthesizes a synthetic facial image $P_1=G_d(p_1, n)$ that resembles the identity, expression, illumination, and pose as specified by the randomly sampled feature space $p_1$. For instance, the synthetic facial image $P_1$ is shown at 1002.

The synthetic dataset module 234 further employs the renderer 130 to generate a corresponding synthetic render image based on the randomly sampled feature space $p_1$, e.g., $R_1=Rd(p_1)$. The resulting synthetic render image $R_1$ is illustrated at 1004. In this example, $P_1$ and $R_1$ form a first synthetic image pair 236 of the example synthetic image set 238.

To generate multiple synthetic image pairs 236 within the synthetic image set 238, the synthetic dataset module 234 employs a resampling module 246 to preserve the identity from the first synthetic image pair ($\alpha_1$) and resample $\beta_1, \gamma_1, \delta_1$. In this way, a second feature space is generated with the same identity parameter such that $p_2=\alpha_1, \beta_2, \gamma_2, \delta_2$. Using the techniques described above, a second synthetic image pair 236, e.g., ($P_2, R_2$), is generated that has the same identity as ($P_1, R_1$), however one or more of the other visual parameters differ. Similarly, a third feature space is generated such that $p_3=\alpha_1, \beta_3, \gamma_3, \delta_3$ and $P_3=G_d(p_3, n)$ and $R_3=Rd(p_3)$. Accordingly, in this example the synthetic image set 238 includes three synthetic image pairs 236 with the same identity and varying pose, expression, and illumination.

FIG. 10b depicts an example 1000b of generation of a synthetic dataset 228 including multiple synthetic image sets 238 using the techniques described with respect to FIG. 10a.

For instance, the process above is iterated for "M" number of pairs for each synthetic image set 238, i.e., using the resampling module 246 M number of times for each identity. Further, the synthetic dataset module 234 generates synthetic image sets 238 for "N" number of identities to form the synthetic dataset 228 that includes N×M synthetic image pairs 236. In an example, the number of identities N=10,000 and the number of image pairs for each identity M=7, and thus the synthetic dataset includes 70,000 synthetic image pairs 236. In this way, the techniques described above enable generation of an expanded dataset that includes synthetic image sets 238 including synthetic image pairs 236 with a same identity but with varying other visual attributes.

The reconstruction training module 220 preserves an ability of the generator 134 to preserve the identity parameter of the facial image 120 in the generation of the manipulated digital image 118 by training the generator 134 through reconstruction training. To do so, the reconstruction training module 220 uses both the synthetic dataset 228 and the training dataset 226 (block 1306). The reconstruction training module 220 further configures the generator to map from an input source of the facial image 120 and render image 132 to an output domain of real images.

This is done by inputting one or more of the image pairs 232 and tasking the generator 134 to reconstruct a training facial image of the image pair 232 from the training facial image and its corresponding training render image. Similarly, in some implementations the reconstruction training module 220 utilizes the synthetic dataset 228 to train the generator 134 by inputting one or more of the synthetic image pairs 236 and tasking the generator 134 to reconstruct a synthetic facial image of the synthetic image pair 236 from the synthetic facial image and its corresponding synthetic render image.

An example 1100 of the training processes are illustrated in FIG. 11 in first and second stages 1102 and 1104. For instance, first stage 1102 illustrates an example of reconstruction training implemented by the reconstruction training module 220. In the illustrated example, the reconstruction training module 220 utilizes an image pair 232 from the training dataset. As noted above, reconstruction training also leverages use of the synthetic dataset 228 in a similar manner. In the example, the reconstruction training module 220 tasks the generator 134 to produce an output image 1106 as visually similar as possible to the facial training image of the image pair 232.

For instance, where the image pair 232 is represented as $(P_{in}, R_{in})$, and the output image 1106 is represented as $P_{out}$, the objective of the generator 134 is to generate $P_{out}$ to be visually identical to $P_{in}$. To do so, the reconstruction training module 220 assigns a target output $P_{tg}=P_{in}$. A loss function for the reconstruction training (e.g., reconstruction loss) is constructed based on the relative success of the generator 134 in performance of this task.

For instance, the reconstruction loss function for the reconstruction training is defined as: $\mathcal{L}_{rec}=\mathcal{L}_{GAN}+\lambda_1 \mathcal{L}_{id}+\lambda_2 \mathcal{L}_{norm}+\lambda_3 \mathcal{L}_{per}$ where $\lambda_1, \lambda_2, \lambda_3$ are weights for different respective losses. $\mathcal{L}_{id}$ is a face identity loss, for instance defined as $\mathcal{L}_{id}=\|N_f(P_{out})-N_f(P_{tg})\|_2^2$ where $N_f$ is a face recognition network used to define the face identity loss. $\mathcal{L}_{norm}$ is an $\ell 1$ loss, e.g., between two images such that $\mathcal{L}_{norm}=\|P_{out}-P_{tg}\|_1$. $\mathcal{L}_{per}$ is an LPIPS (learned perceptual image patch similarity) perceptual loss, e.g., $\mathcal{L}_{per}$=LPIPS$(P_{out}, P_{tg})$. Imposition of $\mathcal{L}_{norm}$ and $\mathcal{L}_{per}$ enforces $P_{out}$ and $P_{tg}$ to have similar low-level features and high-level perception. The loss function also includes a GAN training loss, $\mathcal{L}_{GAN}$ such that the generated images $P_{out}$ match the distribution of $P_{tg}$.

In the example, the above-described reconstruction training process is iterated for each image pair 232 in the training dataset 226 and each synthetic image pair 236 in the synthetic dataset 228. In this way, the reconstruction training module 220 is operable to progressively refine the capability of the generator 134 to effectively preserve the identity parameter of facial images 120 in generation of manipulated digital images 118.

The training module 202 also includes the disentangled training module 222 operable to train the generator 134 using disentangled training to enable editability of one or more visual parameters of the facial image 120 in generation of the manipulated digital image 118 using the synthetic dataset 228 (block 1308). In an example, the disentangled training includes sampling two synthetic image pairs 236, for instance a first synthetic image pair 236 and a second synthetic image pair 236 with a same identity parameter. Using the two synthetic image pairs 236, the disentangled training module 222 tasks the generator to replicate a synthetic facial image from the first synthetic image pair 236 based on a synthetic facial image from the second synthetic image pair 236 and a synthetic render image from the first synthetic image pair 236.

An example of this disentangled training is illustrated at second stage 1104 of FIG. 11. The disentangled training module 222 samples two synthetic image pairs 236 from the same synthetic image set 238, for instance represented as a first synthetic image pair $(P_1, R_1)$ and a second synthetic image pair $(P_2, R_2)$ where the pairs share the same identity, and have differing pose, expression, and illumination. The disentangled training module 222 tasks the generator 134 with producing an output image 1108, represented in this example as $P_{out}$, that is as visually similar as possible to $P_1$ given an input of $P_2$ and $R_1$. To do so, the disentangled training module 222 utilizes the generator 134 to generate the output image 1108, for instance $P_{out}=G(P_2, R_1)$ where G represents the generator 134. A target image is defined as $P_{tg}=P_1$ and a disentangled loss $\mathcal{L}_{dis}$ is imposed between $P_{tg}$ and $P_{out}$ as $\mathcal{L}_{dis}=\mathcal{L}_{GAN}+\lambda_1 \mathcal{L}_{id}+\lambda_2 \mathcal{L}_{norm}+\lambda_3 \mathcal{L}_{per}+\lambda_4 \mathcal{L}_{con}$ where $\lambda_1, \lambda_2, \lambda_3,$ and $\lambda_4$ are weights for different respective losses.

Similar to the loss defined for reconstruction training, $\mathcal{L}_{id}$ is a face identity loss, $\mathcal{L}_{norm}$ is an $\ell 1$ loss, $\mathcal{L}_{per}$ is an LPIPS perceptual loss, and $\mathcal{L}_{GAN}$ is a GAN training loss between $P_{tg}$ and $P_{out}$. The disentangled loss also includes a content loss $\mathcal{L}_{con}$ to enforce target editing signals where $\mathcal{L}_{CON}=\|M\odot(P_{out}-R_{tg})\|_2^2$ where a target render image $R_{tg}=R_2$, M is the face region that $R_{tg}$ has non-zero pixels, and $\odot$ is an element-wise multiplication operator. To optimize computational efficiency, this process is repeated using $P_1$ and $R_2$ to generate an image as close as visually possible to $P_2$. The disentangled training is further iterated for a plurality of images in the synthetic dataset 228. In this way, the generator 134 is trained to incorporate disentangled edits into an input facial image while preserving the identity of the facial image.

The training module 202 also includes a schedule module 248 configured to utilize a learning schedule to alternate between the reconstruction training and the disentangled training (block 1310). For instance, for every S iterations of training, the schedule module 248 implements a learning schedule to perform one step of disentangled training and S−1 steps of reconstruction training. The training module employs the alternate training schedule to optimize both editability and identity preservation of the generator 134.

The schedule module 248 is further operable to implement separate training phases. In an example, the schedule module 248 implements a two-phase training process. In the first phase, the synthetic dataset 228 is used for both the reconstruction training and the disentangled training. In the second phase, the training dataset 226 is used in reconstruction training, while the synthetic dataset 228 is used for disentangled training. In some implementations, the number of iterations in the first phase and the second phase are same, e.g., 140,000 iterations of first phase followed by 140,000 iterations of second phase. In other implementations, the number of iterations vary between the first and second phases.

Using the training dataset 226 for reconstruction training increases the ability of the generator 134 to create photorealistic manipulated digital images 118. Additionally, the use of the synthetic dataset first for both disentangled training and reconstruction training improves the ability of the generator 134 to preserve identity of the facial image 120 in generation of manipulated digital images 118. Accordingly, the two-phase training leverages advantages from training on both datasets to optimize photorealism and identity preservation.

Example System and Device

Figure 14:
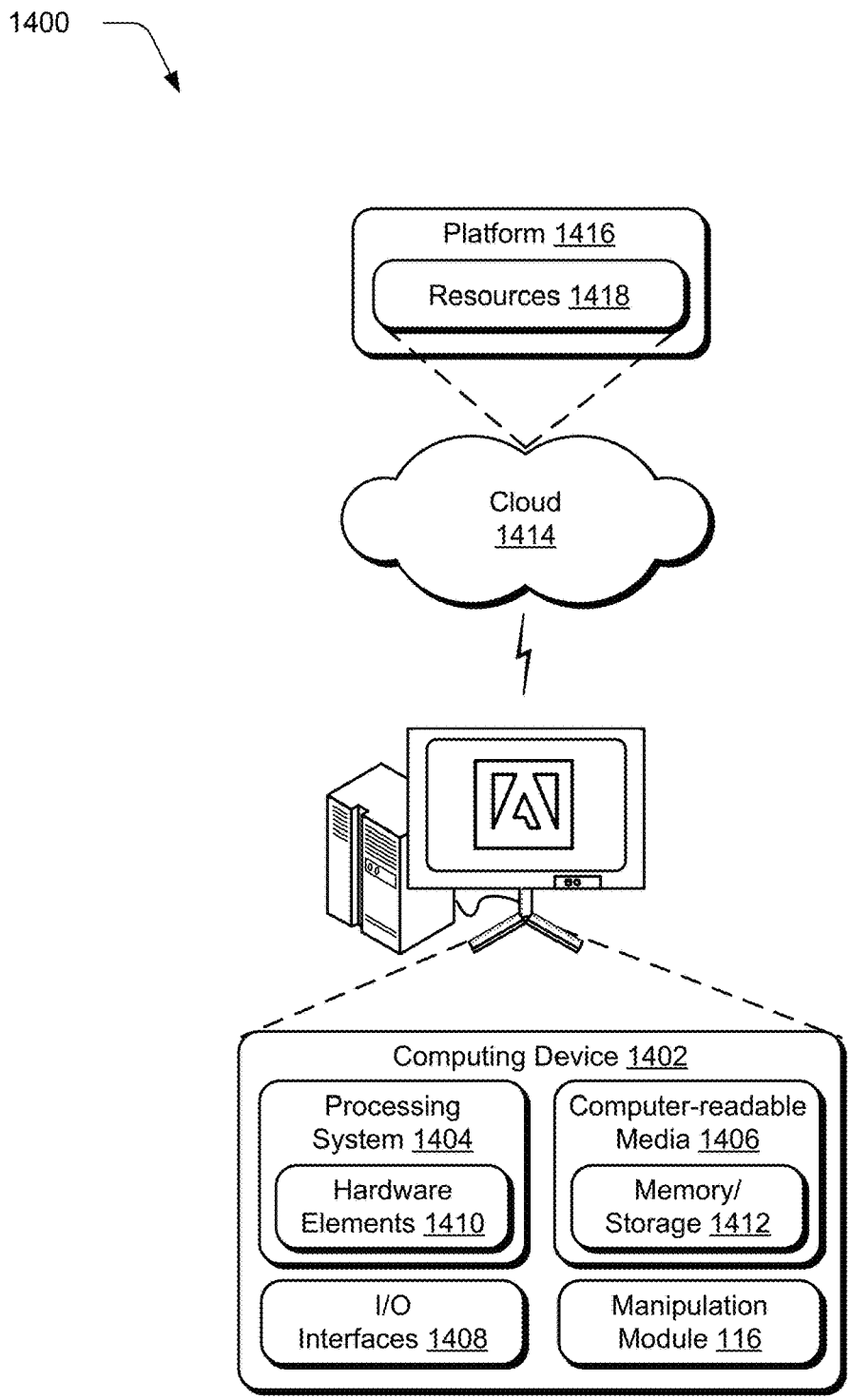
FIG. 14 illustrates an example system including various components of an example device that can be implemented as any type of computing device as described and/or utilize with reference to FIGS. 1-13 to implement embodiments of the techniques described herein.

FIG. 14 illustrates an example system generally at 1400 that includes an example computing device 1402 that is representative of one or more computing systems and/or devices that implement the various techniques described herein. This is illustrated through inclusion of the manipulation module 116. The computing device 1402 is configurable, for example, as a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that is configurable as processors, functional blocks, and so forth. This includes implementation in hardware as an application specific integrated circuit or other logic device formed using one or more semiconductors. The hardware elements 1410 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1406 is illustrated as including memory/storage 1412. The memory/storage 1412 represents memory/storage capacity associated with one or more computer-readable media. The memory/storage 1412 includes volatile media (such as random access memory (RAM)) and/or nonvolatile media (such as read only memory (ROM), Flash memory, optical disks, magnetic disks, and so forth). The memory/storage 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1410. The computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing system 1404. The instructions and/or functions are executable/operable by one or more articles of manufacture (for example, one or more computing devices 1402 and/or processing systems 1404) to implement techniques, modules, and examples described herein.

The techniques described herein are supported by various configurations of the computing device 1402 and are not limited to the specific examples of the techniques described herein. This functionality is also implementable all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 abstracts resources and functions to connect the computing device 1402 with other computing devices. The platform 1416 also serves to abstract scaling of resources to provide a corresponding level of scale to encountered demand for the resources 1418 that are implemented via the platform 1416. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   a memory component; and
   a processing device coupled to the memory component, the processing device configured to perform operations including:
   extracting a feature space from a facial image captured in a digital image, the feature space including an identity parameter defining an identity of the facial image and at least one visual parameter associated with the facial image;
   applying an edit to the at least one visual parameter and preserving the identity parameter;
   generating, by a renderer of the processing device, a render digital image depicting a three-dimensional morphable model reconstruction of the facial image based on the edit;
   encoding the facial image to a first latent space of a generator of a neural network using a first encoder and the render digital image to a second latent space of the generator different from the first latent space using a second encoder, the first latent space and the second latent space combined using element-wise multiplication; and
   generating a manipulated digital image that depicts a reconstruction of the facial image having the edit by processing the encoded facial image and the encoded render digital image by the generator.

2. The system as described in claim 1, wherein the at least one visual parameter is a pose, expression, or illumination associated with the facial image.

3. The system as described in claim 1, wherein the render digital image is encoded to a modulation space and the facial image is encoded to an extended modulation space, the extended modulation space having a dimensionality based in part of a number of layers in the generator.

4. The system as described in claim 3, wherein the render digital image is further encoded to an input tensor space.

5. The system as described in claim 3, wherein the modulation space and the extended modulation space are multiplicatively combined.

6. The system as described in claim 1, wherein either the facial image or the render digital image is at least partially encoded to a modulation space and the other of the facial image or the render digital image is at least partially encoded to an input tensor space.

7. The system as described in claim 6, wherein the modulation space is an extended modulation space having a dimensionality based in part of a number of layers in the generator to allow varied layer modulation.

8. The system as described in claim 1, wherein extracting the feature space includes extracting a reference feature space from a reference facial image with a different identity parameter than the facial image and the edit applied to the at least one visual parameter is based in part on the reference feature space.

9. The system as described in claim 1, the operations further including training the generator using disentangled training to enable editability of the at least one visual parameter and using reconstruction training to preserve the identity parameter of the facial image in the generating the manipulated digital image.

10. The system as described in claim 9, wherein the disentangled training includes training the generator to manipulate one of the visual parameters included in the feature space and preserve the other of the visual parameters included in the feature space.

11. The system as described in claim 1, wherein the edit includes a series of edits and the generator is configured to generate a series of manipulated digital images based on the series of edits to form an animation of the facial image.

12. A non-transitory computer-readable storage medium storing executable instructions, which when executed by a processing device, cause the processing device to perform operations comprising:
   extracting a feature space from a facial image captured in a digital image, the feature space including an identity parameter defining an identity of the facial image and a visual parameter associated with the facial image;
   defining an edit to the visual parameter and preserving the identity parameter;
   generating a render digital image depicting a three-dimensional morphable model reconstruction of the facial image based on the edit, the render digital image preserving the identity parameter;
   encoding the render digital image to a first latent space of a generator of a neural network using a first encoder and encoding the facial image to a second latent space of the generator different from the first latent space using a second encoder;
   combining the first latent space and the second latent space using element wise multiplication; and
   generating a manipulated digital image depicting a reconstruction of the facial image having the edit by processing the encoded facial image and the encoded render digital image by the generator.

13. The non-transitory computer-readable storage medium as described in claim 12, wherein the generator is trained using a combination of reconstruction training and disentangled training, the disentangled training enables editability of the visual parameter and the reconstruction training preserves the identity parameter of the facial image in the generating of the manipulated digital image.

14. A method comprising:
   extracting, by a processing device, a feature space from a facial image captured in a digital image, the feature space including an identity parameter defining an identity of the facial image and a visual parameter associated with the facial image;
   applying, by the processing device, an edit to the visual parameter and preserving the identity parameter within the feature space;
   generating, by the processing device, a render digital image depicting a three-dimensional morphable model reconstruction of the facial image based on the edit;
   encoding, by the processing device, the facial image to a first latent space using a first encoder and encoding the render digital image to a second latent space different from the first latent space using a second encoder, the first latent space and the second latent space multiplicatively combined; and
   generating, by a generator of a neural network implemented by the processing device, a manipulated digital image that depicts a reconstruction of the facial image having the edit by processing the encoded facial image and the encoded render digital image by the generator.

15. The method as described in claim 14, wherein the visual parameter is a pose, expression, or illumination associated with the facial image.

16. The method as described in claim 14, wherein the render digital image is encoded to a modulation space and the facial image is encoded to an extended modulation space, the extended modulation space having a dimensionality based in part of a number of layers in the generator.

17. The method as described in claim 14, wherein either the facial image or the render digital image is at least partially encoded to a modulation space and the other of the facial image or the render digital image is at least partially encoded to an input tensor space.

18. The method as described in claim 17, wherein the modulation space is an extended modulation space having a dimensionality based in part on a number of layers in the generator to allow varied layer modulation.

19. The method as described in claim 14, further comprising extracting a reference feature space from a reference facial image with a different identity parameter than the facial image and editing the visual parameter based on the reference feature space.

20. The method as described in claim 14, further comprising training the generator using disentangled training to enable ed itability of the visual parameter and using reconstruction training to preserve the identity parameter of the facial image in the generating the manipulated digital image.

* * * * *

UNITED STATES PATENT AND TRADEMARK OFFICE
CERTIFICATE OF CORRECTION

| | | |
|---|---|---|
| PATENT NO. | : 12,361,601 B2 | Page 1 of 1 |
| APPLICATION NO. | : 17/709895 | |
| DATED | : July 15, 2025 | |
| INVENTOR(S) | : Zhixin Shu et al. | |

It is certified that error appears in the above-identified patent and that said Letters Patent is hereby corrected as shown below:

In the Claims

Column 22, Line 48, delete "ed itability" and replace with "editability"

Signed and Sealed this
Twenty-eighth Day of October, 2025

John A. Squires
*Director of the United States Patent and Trademark Office*